June 15, 1965   E. R. ANDREGG ETAL   3,189,692
AUTOMATIC CALL TRANSMITTER
Filed May 8, 1962   9 Sheets-Sheet 1
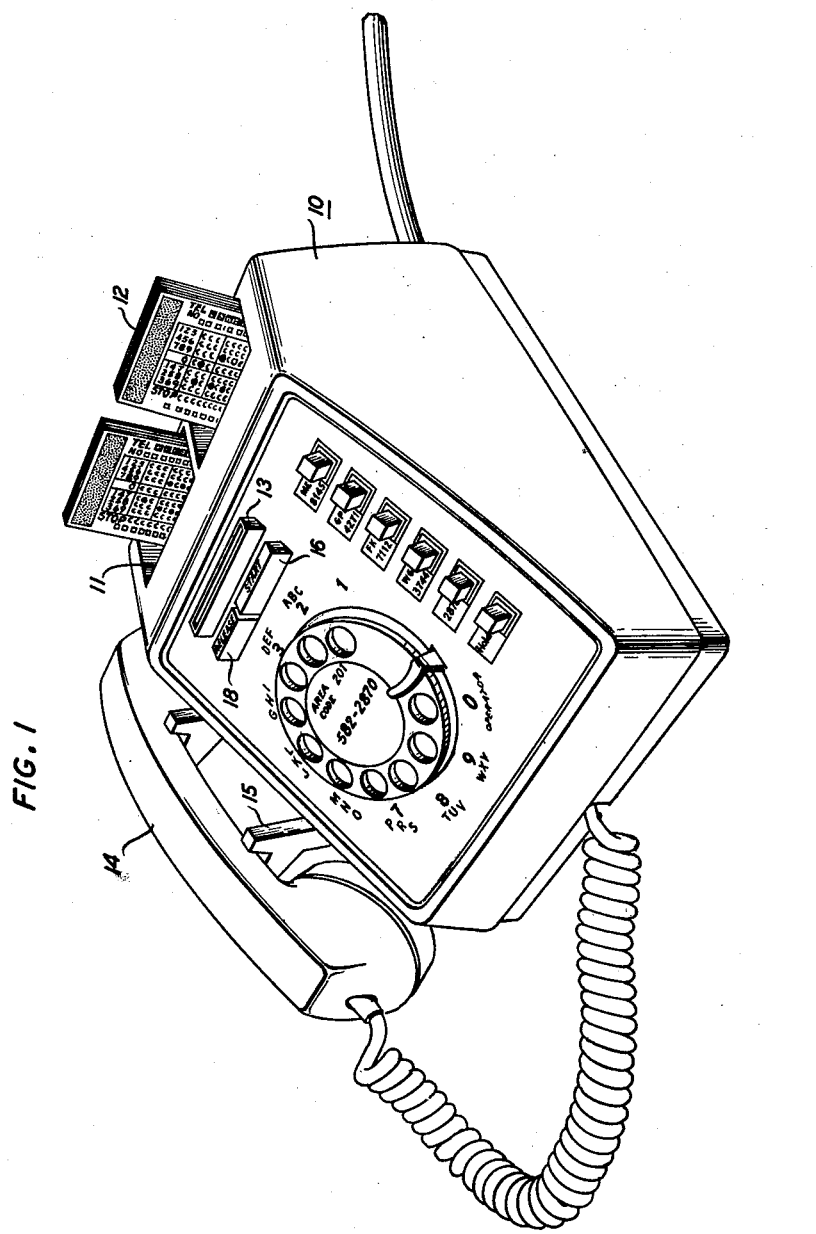
FIG. I
INVENTORS: E.R. ANDREGG
W. PFERD
R.R. STOKES
BY
ATTORNEY

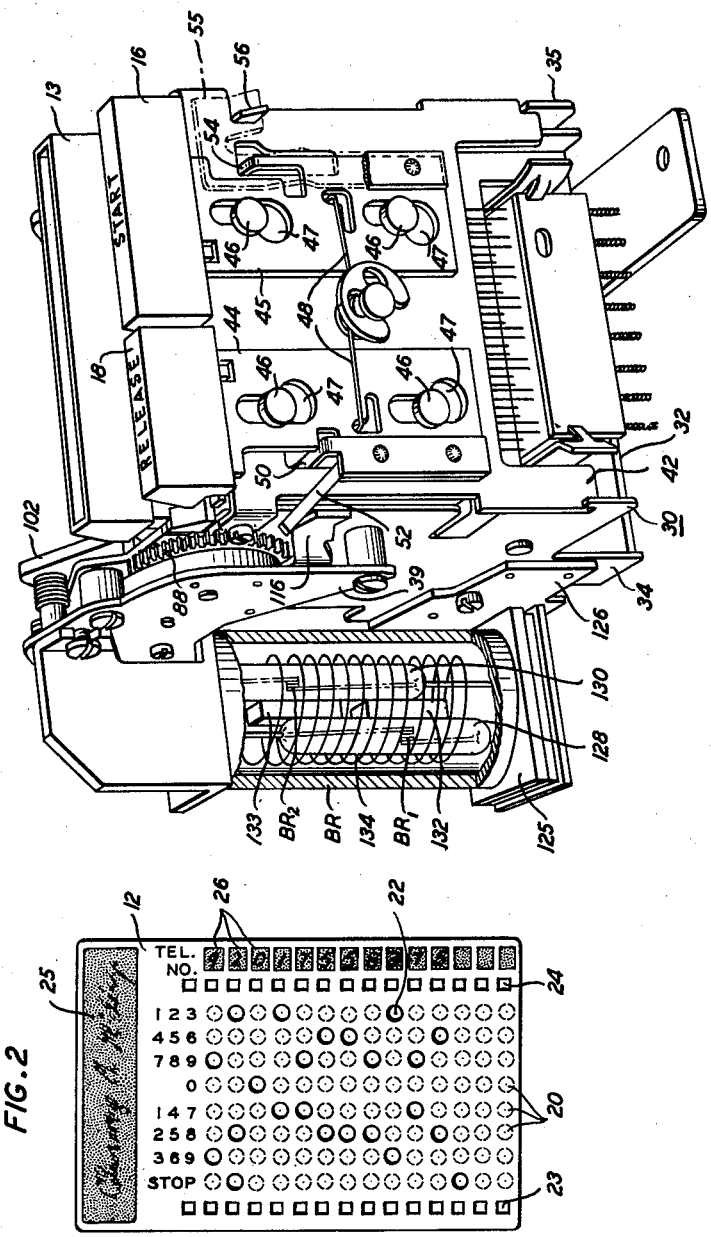

June 15, 1965     E. R. ANDREGG ETAL     3,189,692
AUTOMATIC CALL TRANSMITTER
Filed May 8, 1962                                                     9 Sheets-Sheet 3
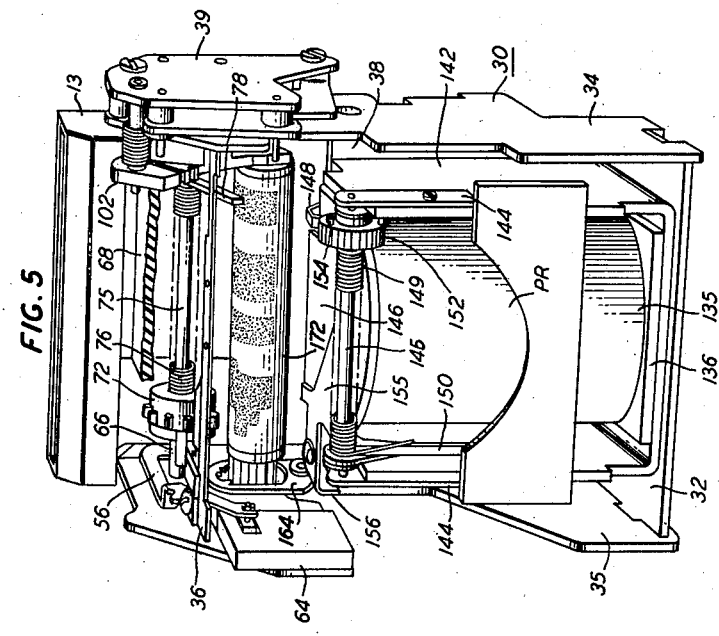
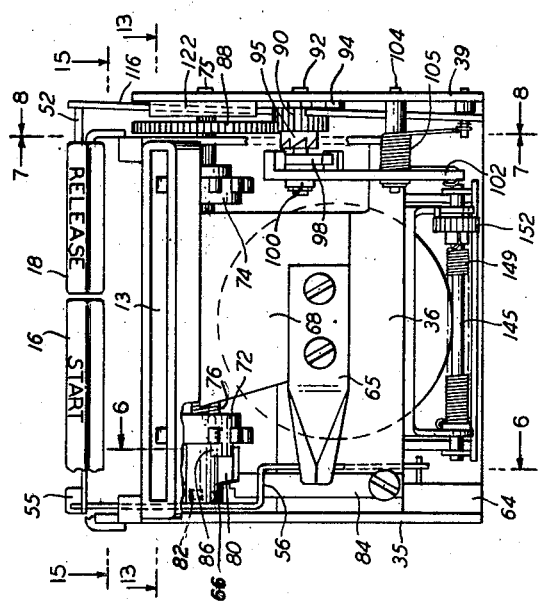

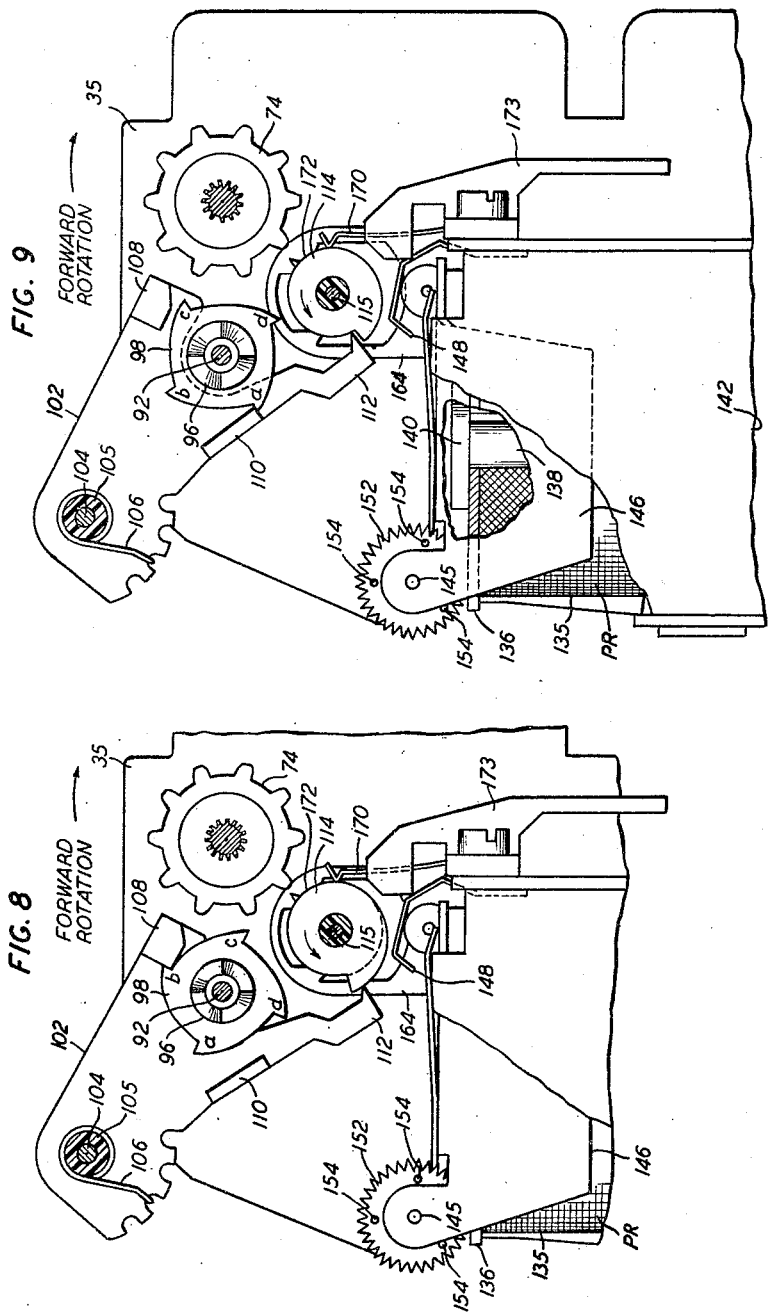

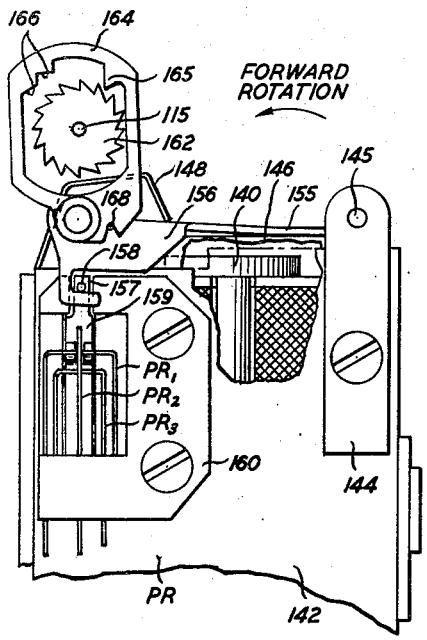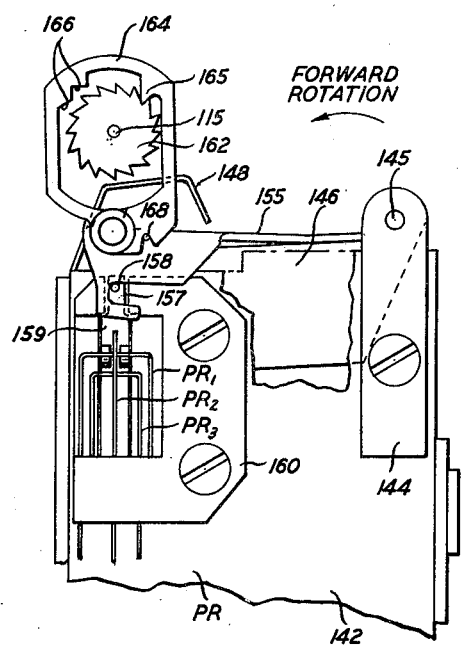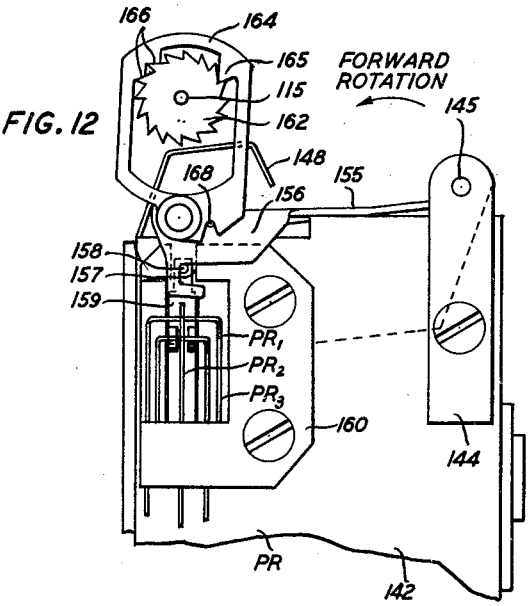

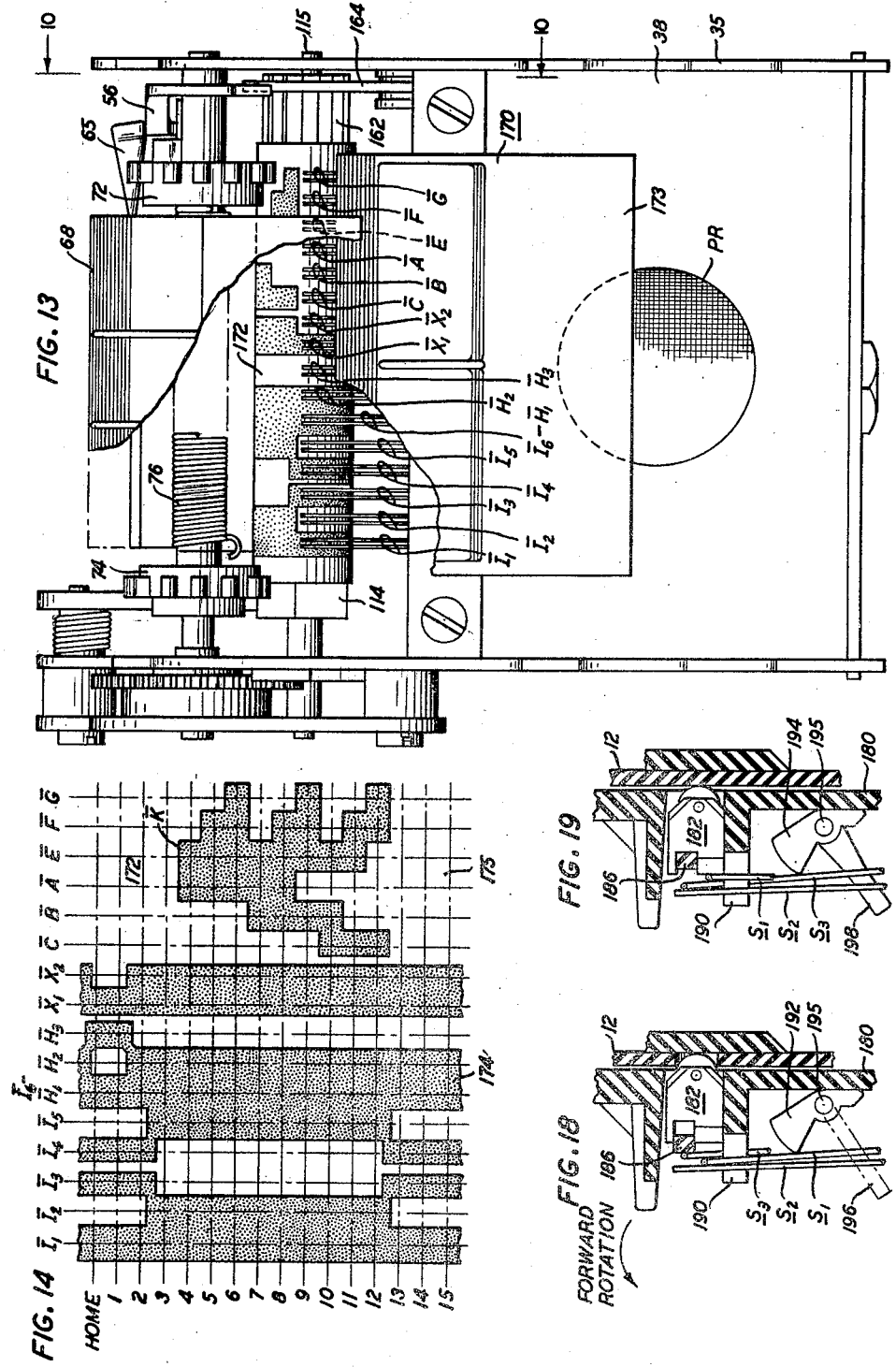

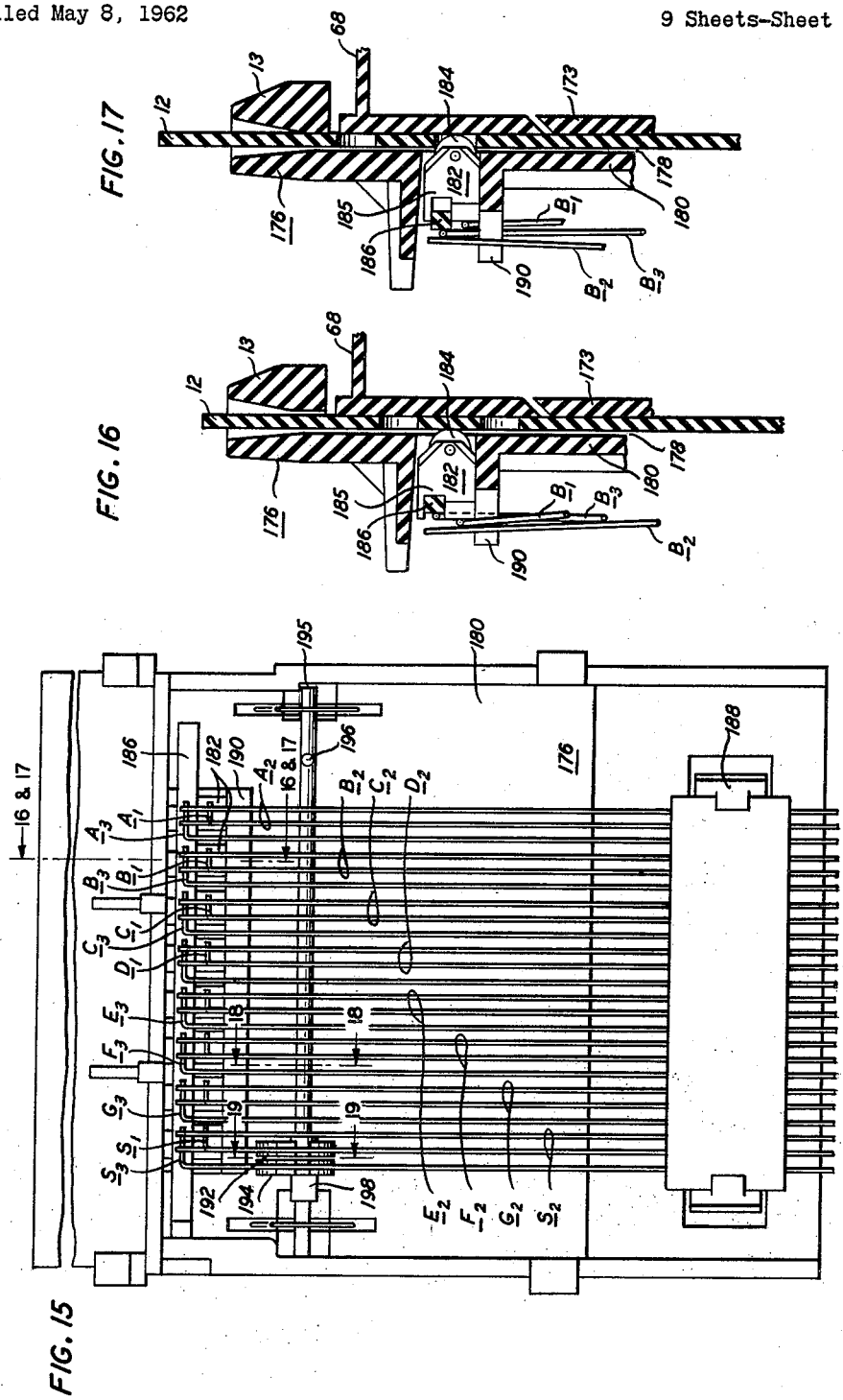

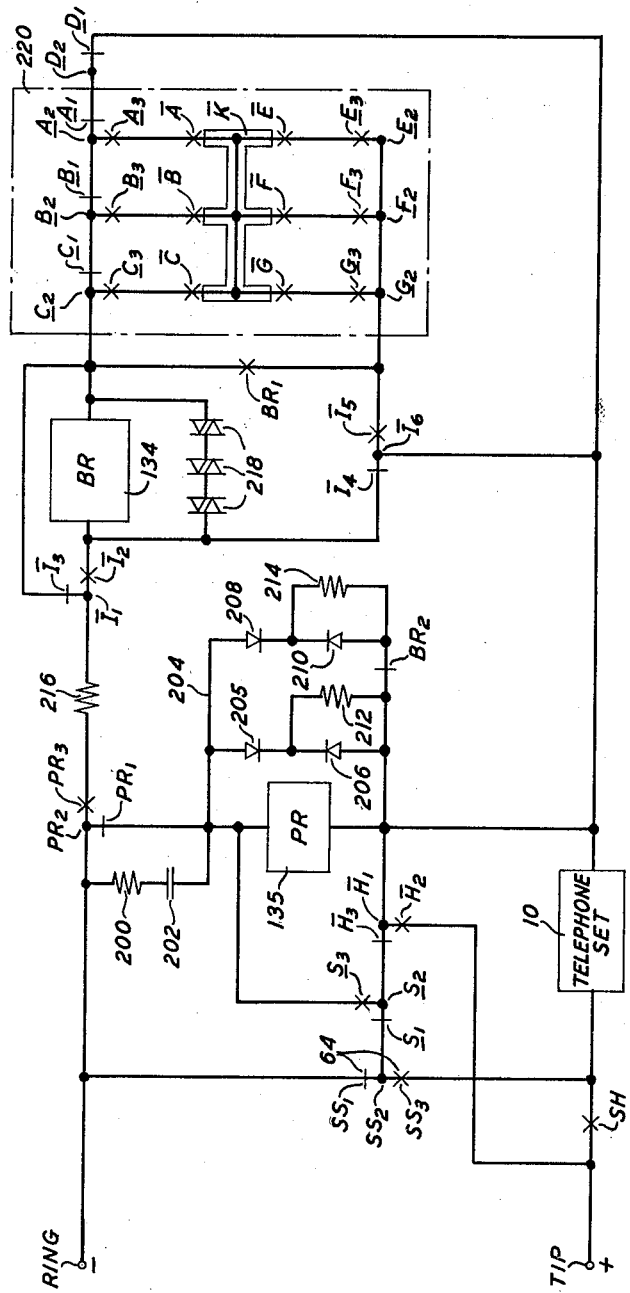

United States Patent Office 3,189,692
Patented June 15, 1965

3,189,692
AUTOMATIC CALL TRANSMITTER
Ernest R. Andregg, Indianapolis, Ind., and William Pferd, Watchung, and Rembert R. Stokes, Springfield, N.J., assignors to Bell Telephone Laboratories, Incorporated, New York, N.Y., a corporation of New York
Filed May 8, 1962, Ser. No. 193,267
20 Claims. (Cl. 179—90)

This invention, which is a continuation-in-part of the copending application of Ernest R. Andregg, William Pferd and Rembert R. Stokes, Serial No. 844,054, filed October 2, 1959 and issued on March 10, 1964, as Patent 3,124,659, relates to telephone call transmitters and particularly to automatic call transmitters.

Many devices have been proposed over the years for the automatic transmission of telephone calls, but nearly all of them include four essential elements. These elements are: a memory for storing specific directory information; means for scanning the memory; means for translating the information stored in the memory; and means under the control of the translating means for generating signals.

The memory of the automatic call transmitter may be an internal part thereof, such as a magnetic drum housed within the call transmitter, or it may be external thereto, such as a group of encoded cards that are individually insertable into the call transmitter. With an external memory the subscriber may physically encode the memory and therefore no encoding apparatus need be provided in the call transmitter. With an external memory the subscriber may also physically select the portion of the memory he wishes to use and therefore no access or display apparatus need be provided in the call transmitter. Finally, since in an external memory the memory is not contained within the call transmitter and only individual portions of the memory are used at a time, the overall size of the call transmitter may be substantially reduced. All of these features make an automatic call transmitter having an external memory exceedingly attractive.

Heretofore, however, when an external memory has been employed, the means for scanning the memory, the means for translating the information stored in the memory, and the signal generating means have required one or more motors and many relays. Such components add to the size and complexity of the call transmitter. Such components also require considerably more power than can be supplied by the central switching office of a telephone system, and therefore these call transmitters have had to rely upon the local power supply of the subscriber. The disadvantages of this arrangement are threefold. First, the telephone subscriber is forced to use his own local power thereby creating a source of subscriber dissatisfaction. Some subscribers do not feel that they should have to pay a telephone bill and also pay for the electricity to operate the call transmitter. Second, the location of the call transmitter in the subscriber's home is limited to the proximity of an electrical outlet. A subscriber cannot necessarily have the call transmitter where it is most convenient for him. Third, the service providied by the call transmitter is disrupted by local power failure. Consequently, the subscriber cannot use the call transmitter when local power supplies are not functioning.

An object of this invention is to provide an automatic call transmitter that is operable off of the power supplied by the central switching office.

Another object of this invention is to provide an automatic call transmitter that is relatively inexpensive to manufacture and relatively small in size.

Still another object of this invention is to provide an automatic call transmitter that is rapid and accurate in operation.

These and other objects of this invention are achieved in an illustrative embodiment thereof wherein:

The memory of the call transmitter comprises an encoded card insertable into the call transmitter, the card including twin columns of sprocket holes;

The means for scanning the memory comprises twin sprockets adapted to mesh with the twin columns of sprocket holes of the card, the sprocket wheels being rotated by the insertion of the card into the call transmitter, a motor spring wound up by the rotation of the sprocket wheels, and an escapement mechanism for intermittently permitting the motor spring to counterrotate the sprocket wheels so as to advance the card out of the call transmitter;

The means for translating the information stored in the memory comprises switching means actuated responsive to the coding on the encoded card, each advancement of the card presenting new information to the switching means, and switching means actuated responsive to the coding on an encoded drum, the drum being rotated through one complete revolution for each advancement of the card and each revolution of the drum presenting a particular sequence of coding to the drum actuated switching means; and The means under the control of the translating means for generating signals comprises a pulsing relay energized by power from the telephone line, the pulsing relay rotating the encoded drum and interrupting the telephone line to transmit pulses thereover, and a blanking relay for shunting the interruptions caused by the pulsing relay.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purpose of illustration and description and is not to be construed as defining the limits of the invention.

In the drawing:

FIG. 1 is a perspective view of a telephone set including the automatic call transmitter of this invention;

FIG. 2 is a plan view of an encoded card that serves as the memory of the automatic call transmitter;

FIG. 3 is a front perspective view of the automatic call transmitter separated from the telephone set, a portion of the start plunger of the operation initiating and terminating means being shown in phantom, and a portion of the blanking relay of the signal generating means being broken away for greater clarity;

FIG. 4 is a top view of the automatic call transmitter the blanking relay being removed;

FIG. 5 is a rear perspective view of the automatic call transmitter, the blanking relay being removed and a portion of the card guide of the translating means being broken away for greater clarity;

FIGS. 8 and 9 are sectional views of the automatic call transmitter taken along line 8—8 of FIG. 4 showing the operation of the escapement pawl of the scanning means;

Figure 6:
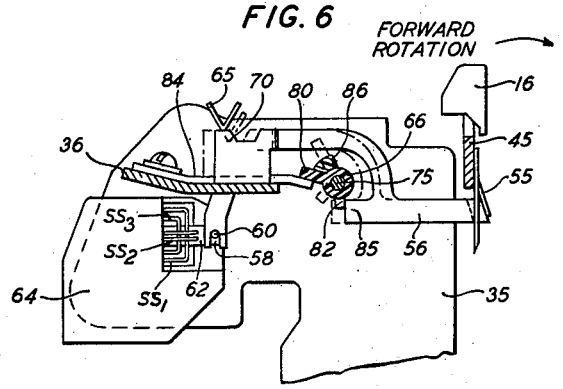
FIG. 6 is a fragmentary sectional view of the automatic call transmitter taken along line 6—6 of FIG. 4 showing a portion of the operation initiating and terminating means.

FIGS. 10, 11, and 12 are sectional views of the automatic call transmitter taken along line 10—10 of FIG. 13 showing the interaction between elements resulting from the energization of the pulsing relay of the signal generating means;

FIG. 13 is a sectional view of the automatic call transmitter taken along line 13—13 of FIG. 4 showing portions of the scanning means and translating means;

FIG. 14 is a development of the encoded drum of the translating means;

FIG. 15 is a sectional view of the automatic call transmitter taken along the line 15—15 of FIG. 4 showing the encoded card actuated switching means of the translating means;

FIGS. 16 and 17 are sectional views of the automatic call transmitter taken along line 16—16 of FIG. 15 showing the interaction between the encoded card and the encoded card actuated switching means;

FIG. 18 is a sectional view of the automatic call transmitter taken along line 18—18 of FIG. 15 showing the interaction between the start cam and the stop hole contacts of the encoded card actuated switching means;

FIG. 19 is a sectional view of the automatic call transmitter taken along line 19—19 of FIG. 15 showing the interaction between the release cam and the stop hole contacts of the encoded card actuated switching means; and FIG. 20 is a circuit diagram of the automatic call transmitter.

General description

The automatic call transmitter of the present invention, hereinafter referred to as the card dialer, is designed to supplement the dialing facilities of the ordinary telephone set by providing automatic means for dialing frequently called numbers. The card dialer may be an integral part of a telephone set 10, as shown in FIG. 1, or it may be a separate unit therefrom. In either case, when the card dialer is not in use, it does not affect the dialing or transmission characteristics of the telephone set with which it is associated.

To operate the card dialer, the subscriber selects from a storage bin 11 in the telephone set 10 or other suitable storage facilities a card 12 that is coded with the telephone number of the party he wishes to call. The card is placed within an entryway 13 of the card dialer and inserted into the card dialer to its full height, the insertion of the card mechanically storing energy in the scanning means of the card dialer. Next, the subscriber removes the handset 14 from the cradle 15 and listens for a dial tone. Hearing a dial tone, he depresses a start button 16 and thereby commences the operation of the card dialer. The scanning means of the card dialer moves the card 12 past the card actuated switching means of the transmitting means, while the signal generating means under the control of the translating means automatically dials the telephone number coded on the card by transmitting signals corresponding to the telephone number. Dialing is rapid and accurate and thereby provides improved telephone service for the subscriber. Upon completion of the dialing, the card dialer is automatically disconnected from the telephone circuit. Then just as in a conventional telephone the subscriber must wait for the called party to answer. If the line should be busy, the coded card 12 is already in position within the entryway 13 to be reinserted into the card dialer. The telephone number may therefore be readily called again at the subscriber's discretion. When the called party answers the telephone, the card 12 is removed from the card dialer and returned to the storage bin 11.

If at any time during the sequence of operation subsequent to the insertion of a card 12 into the card dialer the subscriber changes his mind about calling or discovers he has selected the wrong card, he need only to press a release button 18 adjacent to the start button 16. The operation of the release button 18 terminates the transmission of signals and moves the card from within the card dialer to its threshold position in the entryway 13. In this position the card is no longer in engagement with the scanning means, and it can therefore be removed from the entryway.

Referring now to FIG. 2, the card 12 for operating the card dialer comprises a rectangular planar member that is formed to include an array of removable discs 20, the discs being arranged in fourteen horizontal rows and eight vertical columns. The discs 20 are removed by pressing thereon with a pencil or similar instrument, and when a disc is removed it leaves a hole 22 in the card.

Bordering the array of removable discs 20 is a pair of columns of sprocket holes 23 and 24, the purpose of which is hereinafter explained. It is to be noted that the columns of sprocket holes are asymmetrically located with regard to the sides of the card. In this way the columns of sprocket holes, in addition to their regular function, key the card so that it can only be inserted into the dialer in the proper manner.

At the top of the card 12 an area 25 is provided for recording the name of the subscriber whose telephone number is to be encoded on the card, and along one side of the card a plurality of areas 26 are provided for recording individual digits of the telephone number, each area 26 being in line with one of the rows of removable discs 20. Above each column of removable discs 20 particular information is provided. Above the first column there appears the word "stop," while above the second through fourth and sixth through eighth columns there appear unique digit groupings of three digits each, the digits being selected from the digits 1 through 9 and each individual digit appearing once in groupings above the second through fourth columns and once in the groupings above the sixth through eighth columns. Above the fifth column of removable discs 20 there appears a digit grouping consisting of the digit 0.

To encode the card 12 with the telephone number recorded in the areas 26, the subscriber looks to see what digit is recorded adjacent to a particular row of removable discs 20. This is the digit that the row is to represent. The subscriber then observes in which digit grouping this digit appears and removes from the row the discs that are situated beneath these digit groupings. A detailed description of the card and the coding thereof is found in the copending application of Ernest R. Andregg, Serial No. 125,750, filed July 21, 1961, and issued on December 10, 1963 as Patent No. 3,114,036.

With regard to the removable discs 20 in the column marked "stop," one of these discs is removed from a particular row when it is desirable to stop the operation of the card dialer subsequent to the dialing of the digit represented by the previous row. For example, when the card dialer is being used in an office served by a private branch exchange, it is necessary to dial an initial digit to gain access to an outside trunk line and then observe whether the trunk line is clear before the telephone number of the party to be called can be dialed. In such a situation the removable disc 20 in the second row and beneath the heading "stop" is removed. Then when the encoded card is inserted into the dialer and the start button 16 depressed, the dialer will transmit signals corresponding to the first digit and stop. The calling subscriber will listen for a dial tone indicating that the trunk line is free, and hearing one, he will again depress the start button 16, causing the dialer to transmit signals corresponding to the remaining digits encoded on the card.

Another example of when it is desirable to stop the operation of the card dialer is where the telephone number encoded on the card 12 has less than fourteen digits. The card 12 is provided with fourteen rows or removable discs 20 and is therefore capable of having a fourteen digit telephone number encoded thereon, a fourteen digit telephone number being the largest number presently contemplated for use in the telephone system. Where the telephone number encoded on the card 12 has less than fourteen digits, a removable disc 20 is removed from the "stop" column in the row following the last digit of the telephone number. Then subsequent to the transmission of signals corresponding to the last digit, the operation of the card dialer is stopped instead of having the card dialer continue to scan the card to ascertain whether any additional digits are encoded thereon. Of course stopping the dialer in this situation results in the card remaining partially inserted into the dialer and thereby in engagement with the scanning means of the dialer, and to remove the card it is necessary to depress the release button 18.

*Mechanical description*

In the mechanical description that follows the components of the card dialer will be described in the following order: Frame, Operation Initiating and Terminating Means, Scanning Means, Signal Generating Means, and Translating Means.

*Frame*

Turning now to FIGS. 3 and 5, the dialer has as its foundation a frame 30. The frame includes a bottom plate 32, side plates 34 and 35, and a top plate 36 joined together to form a box. The frame further includes a motor plate 38 extending between and joined to the side plates and an auxiliary side plate 39 secured to and spaced from the side plate 34. The frame is made rigid and accurate by using index surfaces that are held to close tolerances and slots and tabs that are staked together while the frame is held in place by a fixture.

*Operation initiating and terminating means*

As shown in FIG. 3, the operation initiating and terminating means is located at the front of the frame 30, the means including an upright support plate 42 that is secured to the side plates 34 and 35 of the frame. A release plunger 44 and a start plunger 45 are slidably mounted on the support plate 42 by means of nail head pins 46, and slots 47 in the plungers cooperate with the pins 46 to limit the movement of the plungers to a vertical path along the face of the plate. The release button 18 and the start button 16 are respectively mounted on the release and start plungers 44 and 45, and when the buttons are depressed they displace the plunger with which they are associated to a downward position, the plungers when the buttons are released being returned to an upward position by a wire spring 48.

The release plunger 44 includes a rearwardly extending finger 50 and an obliquely extending arm 52 while the start plunger 45 includes a rearwardly extending finger 54 and a laterally extending flexible arm 55, the latter being shown in phantom. Upon the depression of the release button 18, the finger 50 interacts with the translating means to effect the termination of the signal generating means and the arm 52 interacts with the scanning means to effect the release of the encoded card from engagement therewith. Upon the depression of the start button 16, the finger 54 interacts with the translating means to effect the commencement of the signal generating means and the arm 55 interacts with a start latch 56 to connect the card dialer to a telephone line.

Referring to FIG. 6, the start latch 56 is mounted on the top plate 36 so as to be reciprocally movable between a forward position shown in full lines and a rearward position shown in phantom. The start latch 56 includes a slot 58 that accommodates a pin 60 mounted in an actuator 62 of a bistable make-before-break dial start switch 64, the switch being secured to the side plate 35. The switch is of the type disclosed in the copending application of Albert J. Chase and Harold J. Hershey, Serial No. 158,-716, filed November 7, 1961, and assigned to the assignee of this invention, and the switch includes a break contact $SS_1$, a transfer contact $SS_2$ and a make contact $SS_3$. A break contact is herein defined as the contact that is normally in engagement with the transfer contact, and a make contact is defined as the contact that is normally separated from the transfer contact. When the latch is moved from the forward position to the rearward position it operates the switch 64 to transfer the engagement of the transfer contact $SS_2$ from the breck contact $SS_1$ to the make contact $SS_3$. Conversely, when the latch 56 is moved from the rearward position to the forward position it operates the switch 64 to transfer the engagement of the transfer contact $SS_2$ from the make contact $SS_3$ to the break contact $SS_1$.

The movement of the start latch 56 is controlled by three members: the flexible arm 55 of the start plunger 45, a spring 65, and a detent 66. The flexible arm 55 includes a forwardly inclined portion that overlies a similarly inclined forward end of the latch 56, and when the latch is in its forward position these elements are contiguous. Thus when the start plunger 45 is depressed the flexible arm 55 tends to deflect the latch 56 toward its rearward position.

The spring 65 has one end thereof fastened to a rearwardly projecting shelf of a card guide 68. The other end of the spring 65 includes a V-shaped portion, and the bottom edge of this portion bears against a portion of the upper edge of the latch that includes a cam surface 70, the cam surface comprising a forwardly inclined surface intermediate and in series with an upper horizontal and a lower horizontal surface. When the latch 56 is in its forward position the spring 65 bears against the upper horizontal surface adjacent to the inclined surface, and the latch is thereby in a stable position. When the latch is in its rearward position the spring bears against the lower horizontal surface adjacent to the inclined surface, and the latch is again in a stable position. When, however, the latch is intermediate these two positions the spring bears against the forwardly inclined surface and as a result biases the latch in a rearward direction. Thus in this intermediate position the spring tends to move the latch to its rearward position.

The detent 66 is part of the scanning means of the dialer and the interaction between it and the latch will therefore be described in the following section.

*Scannig means*

As seen in FIGS. 4, 5, and 6, the scanning means of the dialer comprises a pair of spaced sprockets 72 and 74 fixedly mounted on a shaft 75 that is journaled in and extends between the side plate 35 and the auxiliary side plate 39. A motor spring 76 is disposed about the shaft 75 in between the sprockets 72 and 74, and one end of the motor spring is hooked into a cavity in the sprocket 72 while the other end of the motor spring is secured to a spring retainer 78 rotatively mounted on the shaft adjacent to the sprocket 74 and biased by the motor spring against the top plate 36. The sprockets 72 and 74 are adapted to respectively engage the columns of sprocket holes 23 and 24 of the card 12 (FIG. 2) upon the placement of the card within the entryway 13 and the insertion of the card into the dialer, and the interaction between the sprocket holes and the sprockets as the card is inserted into the dialer results in the sprockets and thereby the shaft 75 being rotated in a forward direction. The forward direction. The forward rotation of the sprocket 72 winds up the motor spring 76, storing energy therein, and as hereinafter described, this energy is subsequently used to rotate the sprockets 72 and 74 in a rearward direction to move the card 12 out of the dialer.

Rotatively mounted on the shaft 75 adjacent to the sprocket 72 is the detent 66, and it includes a pair of radially extending vanes 80 and 82. The vanes are disposed approximately 100° apart and occupy nonoverlapping positions along the axial length of the detent. As seen most clearly in FIG. 4, a stop 84 fastened to the top plate 36 extends into the path of the vane 80 but not into the path of the vane 82, while a shoulder 85 of the start latch 56 extends into the path of the vane 82 but not into the path of the vane 80. In addition, a tab 86 protruding from the side of the sprocket 72 extends into the path of the vane 80 but is not impeded by the stop 84.

Prior to the insertion of a card 12 into the card dialer, the tab 86 of the sprocket 72 is positioned as shown in FIG. 6 whereby it holds the vane 80 of the detent 66 against the stop 84, the sprocket being biased in a rearward direction by the motor spring 76. In this position of the detent 66 the vane 82 butts against the shoulder 85 of the start latch 56 and locks the latch in its forward position. Thus should the start button 16 be depressed prior to the insertion of a card into the dialer, the latch 56 is prevented from moving to its rearward position, and the flexible arm 55 of the start plunger 45 is deflected forwardly rather than it moving the latch rearwardly.

When a card 12 is inserted into the dialer, the sprocket 72 and thereby the tab 86 is rotated in a forward direction. The movement of the detent 66 is no longer restrained by the tab 86, and therefore the movement of the latch 56 is no longer restrained by the vane 82. Consequently when the start button 16 is depressed subsequent to the insertion of a card into the dialer, the flexible arm 55 of the start plunger 45 deflects the latch 56 rearwardly, and the interaction between the spring 65 and the cam surface 70 of the latch moves the latch to its rearward position.

The latch 56 remains in its rearward position until the motor spring 76 in moving the card out of the card dialer returns the tab 86 of the sprocket 72 to the position shown in FIG. 6. The return of the tab 86 to this position, besides moving the vane 80 against the stop 84, moves the vane 82 into engagement with the shoulder 85 of the latch 56 and moves the latch to its forward position.

Figure 7:
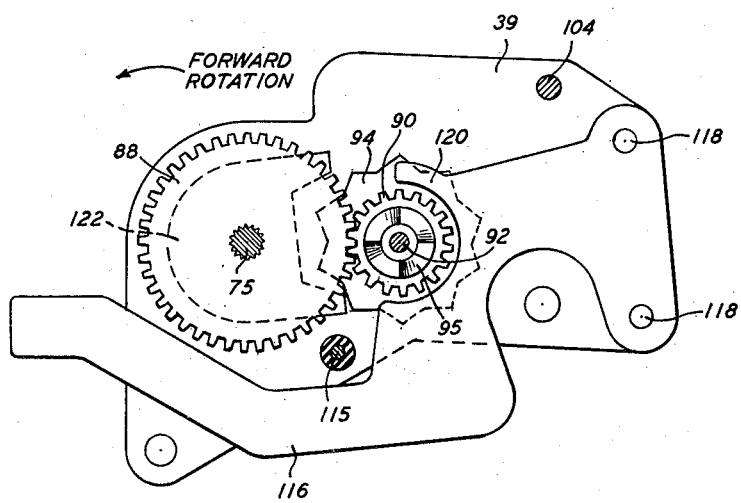
FIG. 7 is a sectional view of the automatic call transmitter taken along line 7—7 of FIG. 4 showing a portion of the scanning means.

Turning now to FIGS. 4, 7, and 8, fixedly mounted on the end of shaft 75 opposite the detent 66 is a gear 88 that meshes with a pinion 90. The pinion 90 is rotatively mounted on a shaft 92 and includes a star wheel 94 on one end thereof and an external face ratchet 95 on the other end thereof, the external face ratchet being adapted to engage a face ratchet 96 that is internal to a ratchet wheel 98. Like the pinion 90, the ratchet wheel 98 is rotatively mounted on the shaft 92 but a band clutch (not shown) disposed about a hub 100 of the ratchet wheel permits only forward rotation of the ratchet wheel. In addition, while the position of the ratchet wheel 98 along the axial length of the shaft 92 is fixed, the pinion 90 is axially displaceable along the shaft. However, a compression spring (not shown) mounted internally to the pinion 90 biases it toward the ratchet wheel 98 thereby tending to maintain the external face ratchet 95 in engagement with the internal face ratchet 96. Finally the teeth of the external and internal face ratchets 95 and 96 have the faces thereof extending substantially parallel to and the backs thereof extending at a high angle to the axis of the shaft 92. Consequently, when the faces of the teeth are rotated away from one another, as when the external face ratchet 95 is rotated rearwardly, the ratchets are able to move relative to one another. When, on the other hand, the faces of the teeth are moved into engagement with one another, as when the external face ratchet 95 is rotated forwardly, the face ratchets lock and there can be no relative motion therebetween.

These features combine to provide the following results. As a card 12 is inserted into the dialer the sprockets 72 and 74 and thereby the gear 88 are rotated in a forward direction and the pinion 90 is rotated in a rearward direction. The ratchet wheel 98 is restrained from moving in a rearward direction by the band clutch (not shown) and hence the external face ratchet 95 slips past the internal face ratchet 96. When the card is no longer being inserted into the dialer, the motor spring 76 acts to rotate the sprockets 72 and 74 rearwardly to move the card out of the dialer. The motor spring 76 thereby acts to rotate the gear 88 rearwardly and the pinion 90 forwardly. As a consequence, the motor spring 76 biases the faces of the teeth of the external face ratchet 95 into engagement with the faces of the teeth of the internal face ratchet 96, and tries to rotate the ratchet wheel 98 in a forward direction.

The forward rotation of the ratchet wheel 98 and thereby the movement of the card 12 out of the card dialer by the rearward rotation of the sprockets 72 and 74 is controlled by an escapement pawl 102, the pawl being rotatively mounted on a shaft 104 that projects laterally from the auxiliary plate 39. The pawl 102 includes a hub 105 that serves to locate the operating elements of the pawl a particular distance from the auxiliary plate 39, and a coil spring 106 disposed about the hub biases the pawl in a rearward direction.

The operating elements of the pawl comprise an upper boss 108, a lower boss 110 and a follower 112. The rearward bias of the coil spring 106 biases the follower 112 into engagement with a cam 114 fixedly mounted on a drum shaft 115, the drum shaft being rearwardly rotated, in a manner hereinafter described, through a complete revolution for each row of punchable discs 20 (FIG. 2) on the card 12 that is scanned by the translating means of the dialer.

When the drum shaft 115 is in a home position, illustrated in FIG. 9, the follower 112 rests at the base of the crown of the cam 114. In this position of the follower 112, the cam 114 so locates the escapement pawl 102 that the lower boss 110 lies in the path of teeth A, B, C, and D on the ratchet wheel 98 and is, for example, in engagemnet with the tooth A on the ratchet wheel, while the upper boss 108 lies above the path of the ratchet wheel teeth. The lower boss 110 thereby blocks the forward rotation of the ratchet wheel 98, and the sprockets 72 and 74 are prevented from rotating in a rearward direction.

During the rearward rotation of the drum shaft 115, the position of the escapement pawl 102 remains the same until toward the end of the revolution whereupon the follower 112 commences to ride up on the crown of the cam 114, and the cam thereby commences to pivot the pawl in a forward direction, gradually moving the lower boss 110 out of and the upper boss 108 into the path of the teeth on the ratchet wheel 98. At approximately fifteen-sixteenths of a revolution the pawl 102 is deflected to the position shown in FIG. 8 wherein the lower boss 110 lies outside the path of the teeth on the ratchet wheel 98 while the upper boss 108 lies in the path of the teeth. The motor spring 76, acting through the gear 88, the pinion 90, and the face ratchets 95 and 96, thereupon rotates the ratchet wheel 98 in a forward direction, but the rotation of the ratchet wheel is shortly arrested by the engagement of the tooth B thereof with the upper boss 108.

Shortly thereafter when the drum shaft 115 completes the revolution and returns to the home position, the follower 112 drops off the crown of the cam 114 and under the bias of the coil spring 106, returns to the position shown in FIG. 9. The upper boss 108 is thereby moved out of and the lower boss 110 is moved into the path of the teeth on the ratchet wheel 98, and the ratchet wheel, biased in a forward direction by the motor spring 76, rotates until its motion is arrested by the engagement of the tooth D with the lower boss 110. Thus for every revolution of the drum shaft 115, the ratchet wheel 98 is permitted to rotate forwardly through a particular angular distance, and this forward rotation of the ratchet wheel is translated by the face ratchets 95 and 96, the pinion 90, and the gear 88 into rearward rotation of the sprockets 72 and 74, the sprockets being rotated through an angular distance to advance the card 12 one row of punchable discs upward.

To release the sprockets 72 and 74 from the control of the ratchet wheel 98 and the escapement pawl 102 and thereby permit rapid removal of a card 12 from the card dialer, a release arm 116 is provided. As seen in FIG. 7, the back end of the release arm is pivoted on two pins 118 secured to the auxiliary plate 39, the pins permitting the arm to swing in a manner similar to a swinging gate. The center of the arm 116 includes a fork portion 120 that encompasses a portion of the pinion 90 and is contiguous with the star wheel 94. Since the star wheel 94 is biased away from the auxiliary side plate 39 by the compression spring (not shown) internal to the pinion 90, the star wheel normally maintains the forward end of the release arm 116 beneath the obliquely extending arm 52 (FIG. 3) of the release plunger 44. However when, as shown in FIG. 4, the release button 18 is depressed, the arm 52 on the release plunger 44 deflects the release arm 116 toward the auxiliary plate 39, and the fork portion 120 thereof acting upon the star wheel 94 deflects the pinion 90 away from the ratchet wheel 98. The external face ratchet 95 is thereby disengaged from the internal face ratchet 96, and because the motor spring 76 is no longer restrained by the ratchet wheel 98, the motor spring unwinds rapidly until the motion of the sprockets 72 and 74 is arrested by the engagement of the tab 86 on the sprocket 72 with the vane 80 of the detent 66, the motion of the vane having been in turn arrested by the stop 84.

To limit the speed at which the sprockets 72 and 74 are rotated by the motor spring 76, the star wheel 94 interacts with a brake 122, seen most clearly in FIG. 7, rotatively mounted on the hub of the gear 88. The brake 122 includes projections that are so located with respect to the teeth on the star wheel 94 that as the star wheel rotates the brake is alternately kicked up and down by the teeth. Since the brake 122 has inertia, this change in direction of its travel absorbs energy from the pinion 90 and thereby slows down the speed of the sprockets 72 and 74.

*Signal generating means*

Referring to FIG. 3, the signal generating means of the card dialer includes a blanking relay BR. The blanking relay comprises a spool 125 mounted on end to the horizontal leg of an L-shaped bracket 126, the vertical leg of which is secured to the side plate 34. Positioned within the spool is a pair of glass sealed reed switches 128 and 130, the switches being of the type disclosed in Patent 2,289,830 issued to Walter B. Ellwood on July 14, 1942, and assigned to the assignee of this invention. Each switch comprises a pair of magnetic reeds sealed within an elongated glass tube, remote ends of the reeds extending through opposing sealed ends of the glass tube and adjacent ends of the reeds overlapping one another to form contact areas. Thus the switch 128 includes contacts $BR_1$ while the switch 130 includes contacts $BR_2$. The switches 128 and 130 are offset from each other in a longitudinal direction, and individual permanent magnets 132 and 133 are respectively positioned adjacent to the overlapping ends of the contacts of each of the switches. The magnets 132 and 133 are oppositely poled, and they are of insufficient strength by themselves to cause the contacts to close.

A single coil 134 is disposed about the switches 128 and 130, and no matter in which direction the current flows through the coil, the flux aids the magnetic flux generated by one of the permanent magnets 132 and 133 and opposes the magnetic flux generated by the other of the permanent magnets. The contacts associated with the permanent magnet being aided close while the contacts associated with the permanent magnet being opposed open. When no current flows through the coil, the permanent magnet associated with the closed contacts maintain the contacts in a closed condition. In the operation of the card dialer the contacts $BR_1$ are normally open and the contacts $BR_2$ are normally closed.

Turning to FIGS. 5 and 9, the signal generating means also includes a pulsing relay PR. The pulsing relay PR comprises a coil 135 disposed about a spool 136 within which is positioned a core 138. The core 138 extends beyond the ends of the spool 136 and the upper end of the core is shaped to provide a pole piece 140, while the lower end of the core is secured in intimate engagement with the base of a U-shaped magnetic yoke 142. The legs of the U-shaped yoke 142 extend along the outside of the coil 135, and posts 144 secured to the legs support a shaft 145 on which is hinged an armature 146. The armature 146 includes a generally horizontal portion that extends in juxtaposition with the pole piece 140, and skirt portions depending from the sides of the horizontal portion that extends in juxtaposition with the legs of the yoke 142. The armature 146 moves between the pole piece 140 and a stop 148, the armature upon energization of the coil being magnetically attracted to the pole piece and upon de-energization of the coil being mechanically biased against the stop by a helical spring 149.

The spring 149 is disposed about the shaft 145 and one end of the spring is secured to a spring retainer 150 while the other end of the spring is secured to a spring adjuster disc 152. The disc 152, the circumferential surface of which is knurled, includes three bosses 154 disposed 120° apart about the periphery thereof and extending laterally from the side thereof adjacent to the armature. The spring 149 biases one of the three bosses 154 into engagement with the armature 146 and by displacing the disc 152 away from the armature and rotating the disc through increments of 120°, the torque exerted on the armature by the spring may be adjusted.

As illustrated in FIG. 5, a bracket 155 is secured to the horizontal portion of the armature 146. The bracket 155 extends leftward for a distance beyond the left leg of the yoke 142 and then bends to provide a side portion 156.

Referring to FIGS. 10, 11, and 12, the side portion 156 of the bracket 155 includes a slot 157 therein in which is positioned a pin 158 mounted in an actuator 159 of a bistable make-before-break pulsing switch 160. The switch which is of the same type as the dial start switch 64 (FIG. 6) includes a break contact $PR_1$, a transfer contact $PR_2$ and a make contact $PR_3$. The slot 157 is larger than the pin 158 to provide a loose linkage between the armature 146 and the switch 160. Thus, when the relay PR is energized and the armature 146 is moved toward the pole piece 140, the side portion 156 of the bracket 155 does not engage pin 158 and operate the switch 160 to transfer the engagement of the transfer contact $PR_2$ from the break contact $PR_1$ to the make contact $PR_3$ until shortly before the armature engages the pole piece. Conversely, when the relay PR is de-energized and the armature 146 is moved toward the stop 148, the side portion 156 of the bracket 155 does not engage the pin 158 and operate the switch 160 to transfer the engagement of the transfer contact $PR_2$ from the make contact $PR_3$ to the break contact $PR_1$ until shortly before the armature engages the stop.

In addition to operating the switch 160 the pulsing relay PR also actuates a sixteen tooth ratchet wheel 162. the ratchet wheel being fixedly mounted on the drum shaft 115. The ratchet wheel 162 is encompassed by a pawl 164 that is pivotally secured to the side portion 156 of the armature bracket 155 and includes an operating finger 165 and a pair of limiting fingers 166. The operating finger 165 and limiting fingers 166 are located a preselected distance apart on opposite sides of the pawl 164, and a wire spring 168 secured to the armature bracket 155 biases the pawl in a forward direction thereby biasing the operating finger side of the pawl against the ratchet wheel 162.

As illustrated in FIGS. 10 through 12, when the relay PR is energized and the armature 146 is moved toward the pole piece 140, the pawl 164 is moved downward with the armature. This downward motion first moves the point of the operating finger 165 into the root of a tooth on the ratchet wheel 162 and then causes the operating finger to rotate the ratchet wheel and thereby the drum shaft 115 in a rearward direction. As the operating finger 165 rotates the ratchet wheel 162, the pawl 164 itself pivots in a rearward direction. The combined downward and rearward movement of the pawl 164 results in the limiting fingers 166 being moved into engagement with the upward moving teeth on the opposite side of the ratchet wheel 162 from the operating finger 165, and the engagement of the limiting fingers with the upward moving teeth arrests the rotation of the ratchet wheel. The operating and limiting fingers 165 and 166 are so located that the rotation of the ratchet wheel 162 is arrested upon the completion of one-sixteenth of a revolution and at substantially the same time that the downward motion of the armature 146 is arrested by its engagement with the pole piece 140.

Translating means

Referring now to FIG. 13, the translating means of the card dialer includes switching means 170 actuated responsive to the coding on an encoded drum 172. The switching means 170 comprises a row of sixteen individual bifurcated wire spring contacts equally spaced along the axial length of the drum 172, the contacts being identified as $\bar{I}_1, \bar{I}_2, \bar{I}_3, \bar{I}_4, \bar{I}_5, \bar{I}_6$–$\bar{H}_1, \bar{H}_2, \bar{H}_3, \bar{X}_1, \bar{X}_2, \bar{C}$, $\bar{B}, \bar{A}, \bar{E}, \bar{S}$, and $\bar{G}$. The lower ends of the contacts are secured to a dielectric guide comb 173 which insulates the contacts from one another and maintains the spacing therebetween. The upper ends of the contacts are biased against the encoded drum 172.

The encoded drum 172 is fixedly mounted on the drum shaft 115 intermediate the ratchet wheel 162 and the cam 114, and thus with each energization of the pulsing relay PR the encoded drum is rotated through one-sixteenth of a revolution, sixteen energizations of the pulsing relay rotating the encoded drum through a complete revolution. The individual contacts describe sixteen separate paths on the drum 172 as the drum rotates, and during a complete revolution of the drum each contact occupies sixteen distinct positions along its path. As shown in FIG. 14, the surface of the drum 172 is provided with a particular pattern of conductive areas 174 and dielectric areas 175. For ease of description a grid has been added to show the paths followed by the individual contact members and the sixteen positions occupied by each contact member during each complete revolution.

It is seen that when the drum 172 is in a home position, which for reference purposes is taken to be the normal position, the contacts $\bar{I}_1$ and $\bar{I}_2$ are open while the contacts $\bar{I}_1$ and $\bar{I}_3$ are closed, the contacts $\bar{I}_4$ and $\bar{I}_6$ are closed while the contacts $\bar{I}_5$ and $\bar{I}_6$ are open, and the contacts $\bar{H}_1$ and $\bar{H}_2$ are open while the contacts $\bar{H}_1$ and $\bar{H}_3$ are closed. The contacts $\bar{C}, \bar{B}, \bar{A}, \bar{E}, \bar{F}$, and $\bar{G}$ which are interconnected in unique groupings by the conductive pattern or contact $\bar{K}$, are open. These connections are maintained when the drum 172 is rotated to the first position. However, as the drum 172 is rotated from the first to the second position, the contact member $\bar{H}_1$ makes with contact $\bar{H}_2$ and then breaks with contact $\bar{H}_3$. In addition, when the drum 172 is rotated from the second to the third position, the contact $\bar{I}_1$ makes with the contact $\bar{I}_2$ and then breaks with the contact $\bar{I}_3$, while the contact $\bar{I}_6$ makes with contact $\bar{I}_5$ and then breaks with contact $\bar{I}_4$. Moreover, as the drum 172 rotates from a third to the fourth position, the contacts $\bar{A}$ and $\bar{E}$ close, both contacts engaging the contact $\bar{K}$.

As exemplified by the first four positions of the contacts, the rotation of the drum 172 results in the contacts making and breaking in a particular sequence, which sequence is determined by the conductive and nonconductive pattern or coding on the drum. Generally this sequence may be described as including two interdigital steps (positions 1 and 2), ten pulsing steps (positions 3 through 12), and four more interdigital steps (positions 13 through home). This sequence is repeated for each rotation of the drum 172, the drum being rotated through a complete revolution for each digit transmitted by the signal generating means.

Referring now to FIGS. 15, 16, and 17, the translating means of the card dialer further includes a switching means 176 actuated responsive to the holes 22 (FIG. 2) in the encoded card 12. The switching means 176, which is of the type disclosed in the copending application of Melville S. Hawley and Harold J. Hershey, Serial No. 175,718, filed February 26, 1962 and issued on August 10, 1964 as Patent 3,144,524, comprises a passageway 178 defined by the entryway 13, a separator 180 integral to the entryway, the card guide 68, and the guide comb 173. The separator 180 includes a row of eight spaced apertures, and situated in each aperture is a dielectric sensing member 182. The spacing between the sensing members 182 is the same as the spacing between the columns of removable discs 20 in the card 12, and when the card is inserted into the passageway 178, it is so located by the engagement of the sprockets 72 and 74 (FIG. 4) with the sprocket holes 23 and 24 therein that the sensing members are in registration with the columns of removable discs. In addition, the sprockets 72 and 74 under the control of the external face ratchet 95 interacting with the internal face ratchet 96 (FIG. 8) and the ratchet wheel 98 interacting with the escapement pawl 102 so locate the card 12 that when the card is fully inserted into the passageway 178 the top row of removable discs 20 is in juxtaposition with the row of sensing members 182 and as the card is advanced out of the dialer the remaining rows of removable discs are sequentially placed in juxtaposition with the row of sensing members.

The end of each sensing member 182 that is in juxtaposition with the passageway 178 includes a roller 184 for making rolling contact with the card 12, while the other end of each sensing member includes portions 185 for engaging a datum bar 186 common to all the sensing members. The datum bar 186 merely rests on the engaging portions 185 of the sensing members 182, and thus the sensing members are individually movable relative to the datum bar.

Groupings of three wire spring contacts are associated with each sensing member 182, the individual groupings being identified as $\underline{S}, \underline{G}, \underline{F}, \underline{E}, \underline{D}, \underline{C}, \underline{B}$, and $\underline{A}$. The contacts within each grouping comprise a break contact indicated by the subnumeral 1, a bifurcated transfer contact indicated by the subnumeral 2 and a make contact indicated by the subnumeral 3. The break contact rests on the end of the sensing member 182 and biases it toward the passageway 178. The make contact rests on the datum bar 186 and biases it toward the engaging portions 185 of the sensing member 182. The transfer contact extends in juxtaposition with both the break and the make contacts and is biased toward the passageway 178.

The lower ends of the contacts, which are secured in a spaced array and insulated from one another by potting, are mounted to the separator 180 by a clamp 188. The upper unsecured ends of the contact members are maintained in the proper transverse spatial relationship by a comb 190, the teeth of which serve to limit the movement of the contacts to a direction perpendicular to the sensing members 182.

When an encoded card 12 is inserted into the passageway 178, each sensing member 182 under the bias of the contacts associated therewith assumes one of two positions: (1) It is resting on the surface of the card, the removable disc 20 therebefore having not been removed; or (2) it is resting in a hole in the card, the removable disc having been removed. Because of the manner in which the card 12 is coded, there is always a majority of sensing members 182 resting on the surface of the card, and these sensing members maintain the datum bar 186 a constant distance from the surface of the card, the datum bar in turn maintaining the make contacts a constant distance from the surface of the card. The break contacts, on the other hand, move with the sensing members 182. When a sensing member 182 is positioned on the surface of the card, which is the normal position of the sensing member, the break contact thereof, as for example $\underline{B}_1$, is positioned a greater distance from the surface of the card than the make contact $\underline{B}_3$ thereof. Consequently, the transfer contact $\underline{B}_2$ is in engagement with the break contact $\underline{B}_1$ and separated from the make contact $\underline{B}_3$.

When a hole moves in front of the sensing member 182, the sensing member moves into the hole and the break contact $\underline{B}_1$ moves therewith. In this position of the sensing member 182 the break contact $\underline{B}_1$ is positioned closer to the surface of the card 12 than the make contact $B_3$, and therefore the transfer contact $\underline{B}_2$ is in engagement with the make contact $\underline{B}_3$. It is to be noted that as the sensing member 182 moves from a position on the surface of the card to a position in a hole in the card there is a make-before-break transfer of the contacts. The transfer contact $\underline{B}_2$ moves with the break contact $\underline{B}_1$ until the transfer contact is arrested by its engagement with the make contact $\underline{B}_3$. The break contact $\underline{B}_1$ continues moving with the sensing member 182, and thus immediately thereafter the break contact $\underline{B}_1$ separates from the transfer contact $\underline{B}_2$.

Although three contacts are provided for each sensing member 182, not all three contacts are utilized in each grouping. In the $\underline{D}$ grouping, only the break contact $\underline{D}_1$ and the transfer contact $\underline{D}_2$ are used, and therefore the contacts are normally closed. In the $\underline{E}$, $\underline{F}$ and $\underline{G}$ groupings, only the transfer contacts $\underline{E}_2$, $\underline{F}_2$, and $\underline{G}_2$ and the make contacts $\underline{E}_3$, $\underline{F}_3$, and $\underline{G}_3$ are used, and therefore the contacts are normally open.

Referring now also to FIGS. 18 and 19, the $\underline{S}$ grouping is associated with the sensing member 182 actuated responsive to the coding of the stop column of the card 12, and a start cam 192 and a release cam 194 are respectively associated with the break contact $\underline{S}_1$ and the make contact $\underline{S}_3$. The start cam 192 is fixedly mounted on a shaft 195 that is rotatively secured to the separator 180 intermediate the separator and the contacts, and the shaft includes a start lever 196 that extends forwardly therefrom. The release cam 194 is rotatively mounted on the shaft 195, and the cam includes a release lever 198 that extends forwardly therefrom.

As illustrated in FIGS. 3, 15, and 18, the start lever 196 underlies the rearwardly extending finger 54 of the start plunger 45, and when the start button 16 is depressed, as when it is desirable to restart the operation of the dialer subsequent to the sensing member 182 having moved into a stop hole in the card 12, the finger engages the start lever and pivots the start cam 192 in a forward direction. The start cam 192 engages the break contact $\underline{S}_1$ and moves it away from its normal resting position on the sensing member 182, and the break contact $\underline{S}_1$ in turn engages the transfer contact $\underline{S}_2$ and moves it away from the sensing member. Thus the depression of the start button 16 assures engagement between the break contact $\underline{S}_1$ and the transfer contact $\underline{S}_2$.

As illustrated in FIGS. 3, 15, and 19, the release lever 198 underlies the rearwardly extending finger 50 of the release plunger 44, and when the release button 18 is depressed, as when it is desired to discontinue the operation of the card dialer, the finger engages the release lever and pivots the release cam 194 in a forward direction. The release cam 194 engages the make contact $\underline{S}_3$ and moves it away from its normal resting position on the datum bar 186, and the make contact $\underline{S}_3$ in turn engages the transfer contact $\underline{S}_2$ and moves it away from the sensing member 182. Thus depression of the release button 18 assures engagement between the make contact $\underline{S}_3$ and the transfer contact $\underline{S}_2$.

*Electrical description*

Turning now to FIG. 20, the telephone set 10 with which the card dialer is associated is of the conventional type such as that disclosed in patent 2,629,783 issued to Harris F. Hopkins on February 24, 1953, and assigned to the assignee of this invention. The telephone set 10 is connected in series with the coil 135 of the pulsing relay PR of the card dialer but shunt paths are provided around both the telephone set and the coil so that depending upon the condition of the start switch 64 one or the other is effectively connected across the telephone line. When the start switch 64 is in the condition shown, the telephone set 10 is connected to the ring side of the telephone line through the normally closed contacts $SS_1$–$SS_2$ of the start switch, the normally closed contacts $\underline{S}_1$–$\underline{S}_2$ of the encoded card actuated switching means 176, and the normally closed contacts $\overline{H}_3$–$\overline{H}_1$ of the encoded drum actuated switching means 170. The telephone set 10 is connected to the tip side of the telephone line through the normally open switchhook contacts SH.

When the start switch 64 is operated to transfer the transfer contact $SS_2$ from the brake contact $SS_1$, to the make contact $SS_3$, the coil 135 of the pulsing relay PR is connected to the ring side of the telephone line through the normally closed contacs $PR_2$–$PR_1$ of the pulsing relay PR, the contacts being protected by a resistor 200 and a capacitor 202 in parallel therewith. The coil 135 is connected to the tip side of the telephone line through one of two paths. The first path is through the normally open switchhook contacts SH, the normally open contacts $SS_3$–$SS_2$ of the start switch 64, the normally closed contacts $\underline{S}_1$–$\underline{S}_2$ of the encoded card actuated switching means 176, and the normally closed contacts $\overline{H}_3$–$\overline{H}_1$ of the encoded drum actuated switching means 170. The second path is through the normally open contacts $\overline{H}_2$–$\overline{H}_1$ of the encoded drum actuated switching means 170.

The particular path employed depends upon whether the contact $\overline{H}_1$ is connected to the contact $\overline{H}_3$ or the contact $\overline{H}_2$. Referring to FIG. 14, it is seen that the contact $\overline{H}_1$ is only connected to the contact $\overline{H}_3$ in the home and first positions of the encoded drum 172, and thus during this portion of each revolution of the drum the coil 135 is connected to the tip side of the telephone line via the first path. During the remainder of each revolution of the drum 172, the contact $\overline{H}_1$ is connected to the contact $\overline{H}_2$, and consequently during this portion of each revolution, the coil 135 is connected to the tip side of the telephone line via the second path. The second path bypasses the normally open switchhook contacts SH, the normally open contacts $SS_2$–$SS_3$ of the start switch 64, and the normally closed contacts $\underline{S}_1$–$\underline{S}_2$ of the encoded card actuated switching means 176.

As set forth in the mechanical description, the energization of the coil 135 of the pulsing relay PR results in the transfer contact $PR_2$ engaging the make contact $PR_3$ and separating from the break contact $PR_1$. The connection between the coil 135 and the ring side of the telephone line is thereby interrupted and the coil is de-energized. Furthermore, if no alternative path is provided between the ring and tip sides of the telephone line, the interruption results in the transmission of a pulse out on the line. Upon de-energization of the coil 135, the transfer contact $PR_2$ engages the break contact $PR_1$ and separates from the make contact $PR_3$. The connection between the coil 135 and the ring side of the telephone line is thereby re-established, and the coil is energized once again.

The speed at which the pulsing relay PR interrupts and re-establishes its connection with the ring side of the telephone line is determined by the mechanical and magnetic forces acting upon the armature of the relay and by a two speed timing network 204 in parallel with the coil 135. The timing network 204 comprises a high speed section consisting of a back biased diode 205 in series with a forward biased diode 206, and a low speed section in parallel with the high speed section consisting of a back biased diode 208 in series with a forward biased diode 210. For operate current flow, the diodes 205 and 208 have a closely controlled avalanche voltage drop, while the diodes 206 and 210 have a very low voltage drop. For release current flow, the diodes 206 and 210 present very high impedances in series with the diodes 205 and 208, which offer very low impedances and low voltage drop. In order that the release current be of useful magnitude and duration, the diodes 206 and 210 are respectively shunted by resistors 212 and 214 to provide controlled current flow of substantial magnitude. The diodes 208 and 210 and resistor 214 in the slow speed section are selected to provide a current flow that together with the proper spring forces acting upon the armature of the pulsing relay PR assure the required pulsing rate, commonly ten operations of the pulsing relay per second. The diodes 205 and 206 and resistor 212 in the high speed section are selected to provide current flow that together with the same spring forces acting upon the armature of the pulsing relay PR assure a faster pulsing rate, such as twenty operations of the relay per second. Normally the low speed section controls the operation of the pulsing relay, but upon the opening of the normally closed contacts $BR_2$ of the blanking relay BR, the low speed section is removed and the operation of the pulsing relay is controlled by the high speed section.

Whether the normally closed contacts $BR_2$ and the normally open contacts $BR_1$ are open or closed is determined by the direction of current flow through the coil 134 of the blanking relay BR. The coil 134 is situated in a blanking circuit that is connected in parallel with the coil 135 of the pulsing relay PR, power being provided to this circuit each time the transfer contact $PR_2$ engages the make contact $PR_3$ and separates from the break contact $PR_1$. The path includes a resistor 216 in series with the coil 134 to match the impedance of the shunt path with the impedance of the path through the coil 135 of the pulsing relay PR. Diodes 218 are in parallel with the coil 134 to limit the voltage across the coil to an acceptable value.

The direction of current flow through the coil 134 of the blanking relay BR is determined by the $\bar{I}$ contacts of the encoded drum actuated switching means 170. With the $\bar{I}$ contacts in the normal condition, that is, with the contacts $\bar{I}_1-\bar{I}_3$ closed and the contacts $\bar{I}_6-\bar{I}_4$ closed, the right side of the coil 134 is connected to the ring side of the line and the left side of the coil is connected to the tip side of the line. Therefore when power is applied to the blanking circuit, current flow through the coil 135 is, except for one situation set forth hereafter, from right to left, and current flow in this direction opens or maintains open the normally open contacts $BR_1$ and closes or maintains closed the normally closed contacts $BR_2$. As seen in FIG. 14, the $\bar{I}$ contacts are maintained in the normal condition during the home, first, second, thirteenth, fourteenth, and fifteenth positions of the encoded drum 172. In these positions, referred to as the interdigital positions, the blanking circuit always provides a conductive path between the ring and tip sides of the telephone line, thereby blanking the pulses of the pulsing relay PR, and the pulsing relay usually operates at low speed.

With the $\bar{I}$ contacts switched, that is with the contacts $\bar{I}_1-\bar{I}_2$ closed and the contacts $\bar{I}_6-\bar{I}_5$ closed, the left side of the coil 135 of the blanking relay BR is connected to the ring side of the line and the right side of the coil is connectable to the tip side of the line through either (1) a switching matrix 220, (2) the normally open contacts $BR_1$ of the blanking relay BR, or (3) the normally closed contacts $\underline{C}_2-\underline{C}_1$, $\underline{B}_2-\underline{B}_1$, $\underline{A}_2-\underline{A}_1$, and $\underline{D}_2-\underline{D}_1$ of the encoded card actuated switching means 176. When one of these three paths is provided and power is applied to the blanking circuit, current flows through the coil 134 from left to right, closing or maintaining closed the normally open contacts $BR_1$ and opening or maintaining open the normally closed contacts $BR_2$. As seen in FIG. 14, the $\bar{I}$ contacts are in the switched condition during the third through twelfth positions of the encoded drum 172. In these positions, referred to as the pulsing positions, the blanking circuit does not always provide a conductive path between the ring and tip sides of the telephone line, thereby permitting pulses to be transmitted out on the line when the conductive path is not provided. Moreover the pulsing relay operates at low speed when the conductive path is not provided and at high speed when the conductive path is provided.

Referring now to the three alternative paths between the right side of the coil 134 of the blanking relay BR and the tip side of the telephone line, the switching matrix 220 comprises the normally open contacts $\underline{A}_2-\underline{A}_3$, $\underline{B}_2-\underline{B}_3$, $\underline{C}_2-\underline{C}_3$, $\underline{E}_2-\underline{E}_3$, $\underline{F}_2-\underline{F}_3$, and $\underline{G}_2-\underline{G}_3$ of the encoded card actuated switching means 176 respectively connected in series with the normally open contacts $\overline{A}-\overline{K}$, $\overline{B}-\overline{K}$, $\overline{C}-\overline{K}$, $\overline{E}-\overline{K}$, $\overline{F}-\overline{K}$, and $\overline{G}-\overline{K}$ of the encoded drum actuated switching means 170 to form branches. The "A," "B," and "C" branches are connected in parallel to form a first parallel network, and the "E," "F," and "G" branches are connected in parallel to form a second parallel network. The two parallel networks are connected in series with each other to form the matrix.

As set forth in the mechanical description, the normally open switching matrix contacts of the encoded card actuated switching means 176 are closed in unique pairs when the sensing members 182 (FIG. 18) associated therewith move into holes coded in the card 12, and the contacts remain closed until the card is advanced to present new coding to the sensing members. The normally open switching matrix contacts of the encoded drum actuated switching means 170, on the other hand, are sequentially closed in unique groupings during each revolution of the encoded drum 172 (FIG. 14), each grouping being maintained for only one-sixteenth of each revolution and the encoded drum being rotated through a complete revolution for each advancement of the encoded card 12. The coding on the card 12 (FIG. 2) is arranged so that the contacts closed thereby comprise the normally open contacts in one of the branches of the first parallel network and the normally open contacts in one of the branches of the second parallel network. The coding on the encoded drum 172 (FIG. 14) is arranged so that the contacts sequentially closed thereby comprise all the different combinations of the normally open contacts from one of the branches of the first parallel network and the normally open contacts from one of the branches of the second parallel network. Thus for each revolution of the drum, the encoded drum actuated contacts duplicate each of the possible combinations of the encoded card actuated contacts, and when the contacts closed by the encoded drum 172 are in the same respective branches of the first and second parallel networks as the contacts closed by the encoded card 12, a conductive path is provided through the switching matrix 220. Once a conductive path is provided through the switching matrix 220, the blanking circuit is completed and current flows through the coil 134 from left to right, closing the normally open contacts $BR_1$ to maintain the blanking circuit path when the path through the switching matrix is interrupted on the next movement of the encoded drum 172. The switching matrix 220 is adapted to provide a conductive path after the number of interruptions by the pulsing relay PR of the telephone line and thereby the number of pulses transmitted out on the line correspond to the digit sensed by the encoded card actuated switching means.

The third alternative path, that through the normally closed contacts $\underline{C}_2-\underline{C}_1$, $\underline{B}_2-\underline{B}_1$, $\underline{A}_2-\underline{A}_1$, and $\underline{D}_2-\underline{D}_1$, is provided when no coding is presented to the encoded card actuated switching means 176. This path shunts both the switching matrix 220 and the normally open contacts $BR_1$ of the blanking relay BR, and consequently when the $\bar{I}$ contacts of the encoded drum actuated switching means 170 switch, current immediately flows through the coil 134 of the blanking relay BR from left to right, opening the normally closed contacts $BR_2$ and placing the pulsing relay PR in high speed operation. This high speed operation will then continue until some coding is presented to the encoded card actuated switching means that will interrupt the short, because even when the $\bar{I}$ contacts return to their normal condition, the shunt prevents right to left current flow through the coil 134 to close the normally closed contacts $BR_2$.

Description of operation

In the description of operation that follows, the description will relate to the figure set forth in parenthesis until a subsequent figure in parenthesis is set forth. It will be assumed that the card dialer is being used in an office served by a private branch exchange.

The subscriber begins the operation of the card dialer by selecting from the storage bin 11 (FIG. 1) of the telephone set 10 the card 12 that is coded with the telephone number of the party he wishes to call. For purposes of the present description it will be assumed that the card 12 selected is the card shown in FIG. 2. The card 12 is placed in the entryway 13 and inserted into the card dialer, whereupon the twin columns of sprocket holes 23 and 24 (FIG. 2) of the card engage the twin sprockets 72 and 74 (FIG. 4) of the scanning means and rotates them in a forward direction. The forward rotation of the sprockets 72 and 74 moves the tab 86 of the sprocket 72 away from the vane 80 of the detent 66 whereby the vane 80 (FIG. 6) is no longer locked against the stop 84 by the tab 86 and the start latch 56 is no longer locked in its forward position by the vane 82 of the detent 66.

The forward rotation of the sprockets 72 and 74 (FIG. 4) also winds up the motor spring 76 and drives the gear 88, and the interaction between the gear and the pinion 90 rotates the external face ratchet 95 rearwardly. As the external face ratchet 95 rotates rearwardly, it slides past the face ratchet 96 (FIG. 9) internal to the ratchet wheel 98, the ratchet wheel being prevented from rearward rotation by a band clutch (not shown). If the subscriber any time during the insertion of the card 12 into the card dialer removes his hand from the card, the motor spring 76 (FIG. 4) acting through the gear 88 and pinion 90 biases the external face ratchet 95 in a forward direction and the teeth on the external face ratchet move into locking engagement with the teeth on the internal face ratchet 96 (FIG. 9). The ratchet wheel 98 is prevented from rotating forwardly by the lower boss 110 on the escapement pawl 102, and consequently the motor spring 76 is prevented from rotating the sprockets 72 and 74 in a rearward direction to move the card 12 out of the dialer.

When the encoded card 12 (FIG. 2) is fully inserted into the card dialer, the card is positioned with the first row of removable discs 20 presented to the row of sensing members 182 (FIG. 15) of the encoded card actuated switching means 176. The sensing members 182 associated with the contact groupings $\underline{C}$ and $\underline{G}$ are biased by the contacts into holes 22 (FIG. 2) in the first row resulting from the coding of the digit 9, and consequently the transfer contact $\underline{C}_2$ (FIG. 20) engages the make contact $\underline{C}_3$ and separates from the break contact $\underline{C}_1$ while the transfer contact $\overline{G}_2$ engages the make contact $\overline{G}_3$.

The subscriber then removes the handset 14 (FIG. 1) from the cradle 15, thereby closing the normally open switchhook contacts SH (FIG. 20), and the telephone set 10 is connected across the telephone line. The telephone set 10 is connected to the ring side of the telephone line through the normally closed contacts $SS_1$–$SS_2$ of the start switch 64, the normally closed contacts $\underline{S}_1$–$\underline{S}_2$ of the encoded card actuated switching means 176, and the normally closed contacts $\overline{H}_3$–$\overline{H}_1$ of the encoded drum actuated switching means 170. The telephone set 10 is connected to the tip side of the telephone line through the closed switchhook contacts SH. It is seen that the telephone set 10 is also connected to the ring side of the telephone line through the normally closed contacts $PR_2$–$PR_1$, and the coil 135 of the pulsing relay PR, but this path is shorted by the previously referred to ring path.

The subscriber listens for a dial tone, and hearing one he depresses the start button 16 (FIG. 6). The depression of the start button 16 moves the start plunger 45 downwardly, and the flexible arm 55 thereof deflects the latch 56 rearwardly, the interaction between the spring 65 and the cam surface 70 of the latch moving the latch to its rearward position. The latch in moving from its forward to its rearward position operates the actuator 62 of the start switch 64 to transfer the transfer contact $SS_2$ (FIG. 20) from the break contact $SS_1$ to the make contact $SS_3$. As a result, the short across the pulsing relay PR is removed and a short is placed instead on the telephone set 10. The coil 135 of the pulsing relay PR is connected to the ring side of the telephone line through the normally closed contacts $PR_2$–$PR_1$ thereof, and the coil is connected to the tip side of the line through the closed switchhook contacts SH, the normally open contacts $SS_3$–$SS_2$ of the start switch 64, the normally closed contacts $\underline{S}_1$–$\underline{S}_2$ of the encoded card actuated switching means 176, and the normally closed contacts $\overline{H}_3$–$\overline{H}_1$ of the encoded drum actuated switching means 170. Thus the coil 135 is energized.

The energization of the coil 135 (FIGS. 10, 11, and 12) of the pulsing relay PR moves the armature 146 thereof from the stop 148 to the pole piece 140. The downward motion of the armature 146 moves the operating finger 165 of the pawl 164 into the root of a tooth on the ratchet wheel 162 and causes the operating finger to rotate the ratchet wheel and thereby the drum shaft 115 in a rearward direction. As the operating finger 165 rotates the ratchet wheel 162, the pawl 164 itself pivots in a rearward direction, and the combined downward and rearward movement of the pawl results in the limiting fingers 166 thereon being moved into engagement with the teeth of the ratchet wheel and arresting the rotation of the ratchet wheel after one-sixteenth of a revolution.

As the encoded drum 172 (FIG. 13) is fixedly mounted on the drum shaft 115, the encoded drum is rotated through one-sixteenth of a revolution by the energization of the pulsing relay PR. The encoded drum 172 (FIG. 14) is thereby placed in its first position, and in this position the contacts $\bar{I}_1$–$\bar{I}_3$, $\bar{I}_6$–$\bar{I}_4$, and $\overline{H}_1$–$\overline{H}_3$ are all closed.

In addition to rotating the encoded drum 172, the energization of the pulsing relay PR (FIGS. 10, 11 and 12) operates the pulsing switch 160. Shortly before the armature 146 engages the pole piece 140, the side portion 156 of the bracket 155 engages the pin 158 mounted in the actuator 159 of the pulsing switch 160 and operates the switch to transfer the engagement of the transfer contact $PR_2$ (FIG. 20) from the break contact $PR_1$ to the make contact $PR_3$. The ring side of the telephone line is thereby disconnected from the coil 135 of the pulsing relay and connected instead through the normally closed contacts $\bar{I}_1$–$\bar{I}_3$ of the encoded drum actuated switching means 170 to the right side of the coil 134 of the blanking relay BR. Since the left side of the coil 134 is connected to the tip side of the telephone line through the normally closed contacts $\bar{I}_4$–$\bar{I}_6$, the normally closed contacts $\overline{H}_1$–$\overline{H}_3$ of the encoded drum actuated switching means 170, the normally closed contacts $\underline{S}_2$–$\underline{S}_1$ of the encoded card actuated switching means 176, the normally open contacts $SS_2$–$SS_3$ of the start switch 64, and the closed switchhook contacts SH, a path is provided between the ring and tip sides of the telephone line and the telephone line is not interrupted. Furthermore, the flow of current through the coil 134 of the blanking relay BR from right to left maintains the contacts BR₁ and BR₂ in their normally open and normally closed condition respectively.

The disconnection of the ring side of the telephone line from the coil 135 of the pulsing relay PR results in its de-energization, and the armature 146 (FIG. 5) under the bias of the helical spring 149 returns to its position against the stop 148. Shortly before the armature 146 engages the stop 148, the side portion 156 (FIG. 10) of the bracket 155 engages the pin 158 and operates the pulsing switch 160 to transfer the transfer contact PR₂ (FIG. 20) from the make contact PR₃ to the break contact PR₁. The coil 135 is thereby reconnected to the ring side of the telephone line and energized once again.

As before, the energization of the coil 135 of the pulsing relay PR operates the PR contacts to transfer the connection of the ring side of the telephone line from the coil 135 to the coil 134 of the blanking relay BR and rotates the encoded drum 172 (FIG. 14) from its first to its second position. As the encoded drum 172 moves from its first to its second position, the normally open contacts $\overline{H}_1$–$\overline{H}_2$ close and the normally closed contacts $\overline{H}_1$–$\overline{H}_3$ open. The left side of the coil 134 (FIG. 20) of the blanking relay BR is then connected to the tip side of the telephone line through the normally closed contacts $\overline{I}_4$–$\overline{I}_6$ and the normally open contacts $\overline{H}_1$–$\overline{H}_2$ of the encoded drum actuated switching means 170, and as a path is again provided between the ring and tip sides of the telephone line, there is again no interruption of the telephone line.

The path to the tip side of the telephone line through the transfer contact $\overline{H}_1$ and the normally open contact $\overline{H}_2$ bypasses the switchhook contacts SH, the normally open contacts SS₃–SS₂ of the start switch 64, and the normally closed contacts $\underline{S}_1$–$\underline{S}_2$ of the encoded card actuated switching means 176. This path which serves both the coil 134 of the blanking relay BR and the coil 135 of the pulsing relay PR, assures that even if the subscriber decides to terminate the operation of the dialer by returning the handset 14 (FIG. 1) to the cradle 15, the card dialer will continue to receive power from the telepone line until the encoded drum 172 (FIG. 14) is returned to its home position. Upon the return of the encoded drum 172 to the home position, the normally closed contacts $\overline{H}_1$–$\overline{H}_3$ close and the normally open contacts $\overline{H}_1$–$\overline{H}_2$ open, and the path to the tip side is once more through the above-recited contacts. By always returning the encoded drum 172 to its home position, inaccurate dialing by the card dialer is prevented.

On the third energization of the coil 135 of the pulsing relay PR, the encoded drum 172 is advanced to its third position whereupon the normally open contacts $\overline{I}_1$–$\overline{I}_2$ (FIG. 20) close, the normally closed contacts $\overline{I}_1$–$\overline{I}_3$ open, the normally open contacts $\overline{I}_6$–$\overline{I}_5$ close, and the normally closed contacts $\overline{I}_6$–$\overline{I}_4$ open. The ring side of the telephone line is thereby connected to the left side of the coil 134. But because the normally open contacts BR₁ of the blanking relay BR are open, the normally closed contacts $\underline{C}_2$–$\underline{C}_1$ of the encoded card actuated switching means 176 are open, and all the switching matrix contacts of the encoded drum actuated switching means 170 are open, no path is provided between the right side of the coil 134 and the tip side of the telephone line. Consequently the telephone line is interrupted and a pulse is transmitted thereover.

The fourth energization of the coil 135 of the pulsing relay PR advances the encoded drum 172 (FIG. 14) to its fourth position, and in this position of the encoded drum the normally open contacts $\underline{A}$–$\overline{K}$ and $\underline{E}$–$\overline{K}$ in the switching matrix 220 (FIG. 20) close. However, since these contacts are not in the same branches of the switching matrix 220 as the closed contacts $\overline{C}_2$–$\overline{C}_3$ and $\overline{G}_2$–$\overline{G}_3$ of the encoded card actuated switching means 176, still no path is provided through the switching matrix and a second pulse is transmitted out on the telephone line.

In the fifth position of the encoded drum 172 (FIG. 14), the contacts $\overline{A}$–$\overline{K}$, $\overline{E}$–$\overline{K}$, and $\overline{F}$–$\overline{K}$ are closed. In the sixth position of the drum 172, the contacts $\overline{A}$–$\overline{K}$, $\overline{E}$–$\overline{K}$, $\overline{F}$–$\overline{K}$, and $\overline{G}$–$\overline{K}$ are closed. In the seventh position of the drum 172, the contacts $\overline{B}$–$\overline{K}$, $\overline{A}$–$\overline{K}$, and $\overline{E}$–$\overline{K}$ are closed. In the eighth position of the drum 172, the contacts $\overline{B}$–$\overline{K}$, $\overline{A}$–$\overline{K}$, $\overline{E}$–$\overline{K}$, and $\overline{F}$–$\overline{K}$ are closed. In the ninth position of the drum 172, the contacts $\overline{B}$–$\overline{K}$, $\overline{E}$–$\overline{K}$, $\overline{F}$–$\overline{K}$, and $\overline{G}$–$\overline{K}$ are closed. In the tenth position of the drum 172, the contacts $\overline{C}$–$\overline{K}$, $\overline{B}$–$\overline{K}$, and $\overline{E}$–$\overline{K}$ are closed, and in the eleventh position of the drum 172, the contacts $\overline{C}$–$\overline{K}$, $\overline{E}$–$\overline{K}$, and $\overline{F}$–$\overline{K}$ are closed. In each of these positions, the closed contacts of the encoded drum actuated switching means 170 are not in the same branches of the switching matrix 220 (FIG. 20) as both the closed contacts of the encoded actuated switching means 176, and hence the third, fourth, fifth, sixth, seventh, eighth, and ninth pulses are transmitted out on the telephone line.

Finally in the twelfth position of the encoded drum 172, the contacts $\overline{C}$–$\overline{K}$, $\overline{F}$–$\overline{K}$, and $\overline{G}$–$\overline{K}$ are closed, and a path is provided from the right side of the coil 134 of the blanking relay BR through the normally open contacts $\underline{C}_2$–$\underline{C}_3$, the normally open contacts $\overline{C}$–$\overline{K}$, the normally open contacts $\overline{G}$–$\overline{K}$, and the normally open contacts $\underline{G}_3$–$\underline{G}_2$ of the switching matrix 220, and the normally open contacts $\overline{I}_5$–$\overline{I}_6$ of the encoded drum actuated switching means 170 to the tip side of the telephone line. The telephone line is therefore not interrupted and current flows through the coil 134 of the blanking relay BR from left to right, closing the normally open contacts BR₁ to provide a bypass around the switching matrix 220 and opening the normally closed contacts BR₂ to place the high speed section of the timing network 204 in control of the pulsing relay PR.

The pulsing relay PR operates at the high speed rate only once because as it advances the encoded drum 172 (FIG. 14) to its thirteenth position, the normally closed contacts $\overline{I}_1$–$\overline{I}_3$ close and the normally open contacts $\overline{I}_1$–$\overline{I}_2$ open while the normally closed contacts $\overline{I}_6$–$\overline{I}_4$ close and the normally open contacts $\overline{I}_6$–$\overline{I}_5$ open. As in the first and second positions of the encoded drum 172, the right side of the coil 134 (FIG. 20) of the blanking relay BR is connected to the ring side of the telephone line and the left side of the coil 134 is connected to the tip side of the telephone line, and therefore there is no interruption of the telephone line. Current flows through the coil 134 right to left, opening the normally open contacts BR₁ to remove the bypass around the switching matrix 220 and closing the normally closed contacts BR₂ to place the low speed section of the timing network 204 back in control of the pulsing relay PR.

As the encoded drum 172 is moved to the fourteenth position, the fifteenth position, and back to the home position, the connection of the right side of the coil 134 of the blanking relay BR to the ring side of the telephone line and the left side of the coil to the tip side of the telephone line is maintained, and therefore no interruptions of the telephone line occur in these positions. There is, however, a change in the path to the tip side of the line when the encoded drum 172 returns to the home position. The normally closed contacts $\overline{H}_1$–$\overline{H}_3$ close and the normally open contacts $\overline{H}_1$–$\overline{H}_2$ open, and consequently both the coil 134 of the blanking relay BR and the coil 135 of the pulsing relay PR are again connected to the tip side of the telephone line through the normally closed contacts $\overline{H}_1$–$\overline{H}_3$ of the encoded drum actuated switching means 170, the normally closed contacts $\underline{S}_2$–$\underline{S}_1$ of the encoded card actuated switching means 176, the normally open contacts SS₂–SS₃ of the start switch 64, and the switchhook contacts SH.

As the encoded drum 172 is moved to the fifteenth position and back to the home position, the scanning means of the card dialer operates to advance the encoded card 12 (FIG. 2). As the encoded drum 172 is moved to the fifteenth position, the cam 114 (FIG. 8) rotates the escapement pawl 102 to position the lower boss 110 outside the path of the teeth on the ratchet wheel 98 and to position the upper boss 108 in the path of the teeth. The motor spring 76 (FIG. 4), thereupon rotates the ratchet wheel 98 (FIG. 8) in a forward direction until the motion of the ratchet wheel is arrested by the engagement of a tooth thereof with the upper boss 108. This movement of the ratchet wheel 98 is transmitted to the sprockets 72 and 74 (FIG. 4) to advance the card 12 (FIG. 2) half the distance between rows of removable discs 20.

Then as the encoded drum 172 (FIG. 9) is returned to the home position, the follower 112 of the escapement pawl 102 drops off of the crown of the cam 114 and under the bias of the spring 106 rotates rearwardly. The upper boss 108 thereby moves out of and the lower boss 110 moves into the path of the teeth on the ratchet wheel 98, and the ratchet wheel rotates until its motion is arrested by the engagement of a tooth thereof with the lower boss 110. This movement of the ratchet wheel 98 is transmitted to the sprockets 72 and 74 (FIG. 4) to advance the card 12 (FIG. 2) another half distance between the rows of removable discs 20 whereby the second row of removable discs is presented to the row of sensing members 182 (FIG. 15) of the encoded card actuated switching means 176. The sensing members 182 associated with the contact groupings $\underline{A}$, $\underline{F}$, and $\underline{S}$ are biased by the contacts into holes 22 (FIG. 2) in the card 12 resulting from the coding of the digit 2 and the "stop" column in the second row. As a consequence of the coding of the digit 2, the normally open contacts $\underline{A}_2$–$\underline{A}_3$ (FIG. 20) close and the normally closed contacts $\underline{A}_2$–$\underline{A}_1$ open while the normally open contacts $\underline{F}_2$–$\underline{F}_3$ close. As a consequence of the coding of the "stop" column, the normally open contacts $\underline{S}_2$–$\underline{S}_3$ close and the normally closed contacts $\underline{S}_2$–$\underline{S}_1$ open.

It is seen that with the closing of the normally open contacts $\underline{S}_2$–$\underline{S}_3$ and the opening of the normally closed contacts $\underline{S}_2$–$\underline{S}_1$, a short is placed on the coil 135 of the pulsing relay PR and the short across the telephone set 10 is removed. The telephone set 10 is connected to the ring side of the telephone line through the normally closed contacts $PR_2$–$PR_1$ of the pulsing relay PR, the normally open contacts $\underline{S}_3$–$\underline{S}_2$ of the encoded card actuated switching means 176, and the normally closed contacts $\overline{H}_3$–$\overline{H}_1$ of the encoded drum actuated switching means 170. The telephone set 10 is connected to the tip side of the telephone line through the switchhook contacts SH. The placing of the short across the coil 135 of the pulsing relay PR stops the operation of the card dialer while the removal of the short across the telephone set 10 places the set back in operation. Assuming that the purpose of the first digit was to gain access to an outside trunk line, the subscriber can now listen for a dial tone indicating that the trunk line is available.

Hearing a dial tone, the subscriber depresses the start button 16 (FIG. 3). The depression of the start button 16 moves the start plunger 45 downward whereupon the rearwardly extending finger 54 thereof engages the start lever 196 (FIG. 18) and pivots the start cam 192 in a forward direction. The start cam 192 engages the break contact $\underline{S}_1$ and moves it into engagement with the transfer contact $\underline{S}_2$, disengaging the transfer contact $\underline{S}_2$ from the make contact $\underline{S}_3$. This transfer of contacts removes the short from the coil 135 (FIG. 20) of the pulsing relay PR and once again places a short across the telephone set 10. The card dialer commences operating again and the pulsing relay PR moves the encoded drum 172 (FIG. 14) to its first and then to its second position. As the encoded drum 172 moves from its first to its second position, the normally open contacts $\overline{H}_1$–$\overline{H}_2$ close and the normally closed contacts $\overline{H}_1$–$\overline{H}_3$ open, providing the path to the tip side of the telephone line that bypasses the $\underline{S}$ contacts. Thus when the subscriber removes his finger from the start button 16 (FIG. 1) and the spring 48 returns the start plunger 45 to its upward position, permitting the start cam 192 (FIG. 18) to return to its normal position, the operation of the card dialer continues even though the transfer contact $\underline{S}_2$ again engages the make contact $\underline{S}_3$ and separates from the break contact $\underline{S}_1$.

In transmitting the second and subsequent digits of the telephone number, the card dialer repeats its basic pattern of operation for each digit. In the first, second, thirteenth, fourteenth, fifteenth, and home positions of the encoded drum 172, which provide an interdigital period, no pulses are transmitted out on the telephone line as a path is always provided between the ring and tip sides of the telephone line. In the third through twelfth positions of the encoded drum 172, pulses are transmitted out on the telephone line until a path is provided through the switching matrix 220. Once the path is provided, the blanking relay BR operates to shunt the switching matrix 220 and to place the pulsing relay PR in high speed operation. This shunt around the switching matrix 220 is removed and the pulsing relay PR is returned to slow speed operation during the interdigital period between each digit. In the case of the digit 0, no path is provided through the switching matrix 220 and consequently pulses are transmitted in all of the third through twelfth positions of the encoded drum 172.

After transmitting the last digit of the telephone number, the card 12 (FIG. 2) is moved up one more row and, as described above, the coding of the "stop" column results in the operation of the card dialer being terminated and the telephone set 10 being once more connected across the telephone line. The subscriber then listens for the called party to answer. If the line is busy, the encoded card 12 is in position to be fully reinserted into the card dialer to again call the party after a delay of a few minutes. When the called party answers, the subscriber depresses the release button 18 (FIG. 3) to release the card 12.

The depression of the release button 18 moves the release plunger 44 and consequently the obliquely extending arm 52 and rearwardly extending finger 50 downward. The downward motion of the arm 52 of the release plunger 44 deflects the release arm 116 of the scanning means toward the auxiliary plate 39, moving the pinion 90 (FIG. 4) away from the ratchet wheel 98. The external face ratchet 95 is thereby disengaged from the internal face ratchet 96, and the motor spring 76 rotates the sprockets 72 and 74 to move the card 12 out of the card dialer, the speed at which the sprockets rotate being limited by the interaction between the brake 122 (FIG. 7) and the star wheel 94.

The downward movement of the rearwardly extending finger 50 of the release plunger 44 rotates the release cam 194 (FIG. 19) in a forward direction. The release cam engages the make contact $\underline{S}_3$ and moves it into engagement with the transfer contact $\underline{S}_2$, deflecting the transfer contact $\underline{S}_2$ away from the break contact $\underline{S}_1$. This prevents the transfer contact $\underline{S}_2$ from engaging the break contact $\underline{S}_1$ and separating from the make contact $\underline{S}_3$ as the card is moved out of the dialer and the sensing member 182 (FIG. 15) associated with the $\underline{S}$ grouping is thereby moved out of the stop hole 22. The transfer of these contacts would short the telephone set 10 (FIG. 20), interrupting the conversation between the subscriber and the called party, and remove the short from the coil 135 of the pulsing relay PR, reinstituting the operation of the card dialer. Both of these are clearly undesirable.

The sprockets 72 and 74 (FIG. 4) move the card 12 to a threshold position in the entryway 13, at which point the sprockets are disengaged from the card and the tab 86 (FIG. 6) of the sprocket 72 moves the vane 80 of the detent 66 against the stop 84. The stop arrests the vane 80, and the vane in turn arrests the rotation of the sprockets 72 and 74. The movement of the vane 80 against the stop 84 moves the vane 82 into engagement with the shoulder 85 of the latch 56 and moves the latch to its forward position, thereby operating the start switch 64 to transfer the transfer contact SS₂ from the make contact SS₃ to the break contact SS₁. Thus when the subscriber removes his finger from the release button 18 (FIG. 3) and the spring 48 returns the release plunger 44 to its upward position, permitting the release cam 194 (FIG. 19) to return to its normal position whereby the transfer contact S₂ engages the break contact S₁ and separates from the make contact S₃, the short across the pulsing relay PR and the connection of the telephone set 10 across the telephone line are maintained.

While the invention has been described in terms of a call transmitter for generating signals corresponding to the digits of a telephone number and transmitting the signals out on a telephone line, it is not limited thereto. The invention may be employed in other types of communication systems and may be employed to transmit information other than that identifying a subscriber to the communication system. Thus the term "call transmitter" is intended to encompass code transmitters, and the term "digit" is intended to encompass any bit of information.

What is claimed is:

1. A call transmitter employing a code bearing medium having a plurality of digits encoded thereon, the call transmitter comprising:

means for translating the coding on the code bearing medium;

means under the control of the translating means for generating signals representing the encoded digits, the signal generating means comprising a pulsing relay connectable to a communication line, the pulsing relay being energized by the communication line when connected thereto, and the pulsing relay interrupting the communication line responsive to energization.

2. A call transmitter employing a code bearing medium having a plurality of digits encoded thereon, the call transmitter comprising:

means for translating the coding on the code bearing medium;

means under the control of the translating means for generating signals representing the encoded digits, the signal generating means including a pulsing relay having normally closed contacts actuated thereby in series therewith adapted to connect a pulsing relay across a communication line whereby the pulsing relay is energized, the pulsing relay when energized opening the normally closed contacts whereby the connection of the pulsing relay across the communication line is interrupted and the pulsing relay is de-energized, the pulsing relay when de-energized closing the normally closed contacts, whereby the connection of the pulsing relay across the communication line is remade and the pulsing relay is energized again.

3. A call transmitter as in claim 2 wherein the signal generating means further includes a blanking circuit shunting the pulsing relay, the circuit being opened and closed responsive to the translating means, the circuit when closed providing a connection across the communication line, the circuit when open permitting the pulsing relay to interrupt the communication line and transmit pulses thereover.

4. A call transmitter as in claim 3 wherein the pulsing relay further includes normally open contacts in series with the blanking circuit, the pulsing relay when energized closing the normally open contacts and the pulsing relay when de-energized opening the normally open contacts, whereby the pulsing relay and the blanking circuit are alternatively connected across the communication line.

5. A call transmitter as in claim 2 wherein the translating means includes switching means actuated responsive to the code bearing medium.

6. A call transmitter as in claim 5 wherein the translating means further includes a rotatable encoded drum and switching means actuated responsive to the coding on the encoded drum, the rotation of the encoded drum presenting a particular sequence of coding to the encoded drum actuated switching means.

7. A call transmitter as in claim 6 wherein the code bearing medium actuated switching means includes a plurality of normally open contacts that are closed responsive to the coding on the code bearing medium, and the encoded drum actuated switching means includes a plurality of normally open contacts that are closed responsive to the coding on the drum, the individual normally open code bearing medium actuated contacts being connected in series with individual normally open encoded drum actuated contacts to form branches of a switching matrix, the closing of the pair of contacts in a pair of branches providing a path through the switching matrix.

8. A call transmitter as in claim 7 wherein the signal generating means includes a blanking circuit shunting the pulsing relay, the blanking circuit including the switching matrix, the circuit being closed when a path is provided through the switching matrix, the circuit when closed providing a connection across the communication line, the circuit when open permitting the pulsing relay to interrupt the communication line and transmit pulses thereover.

9. A call transmitter as in claim 8 wherein the pulsing relay further includes normally open contacts in series with the blanking circuit, the pulsing relay when energized closing the normally open contacts and the pulsing relay when de-energized opening the normally open contacts whereby the pulsing relay and the blanking circuit are alternatively connected across the communication line.

10. A call transmitter employing a code bearing medium having a plurality of digits identifying a subscriber to a telephone system encoded thereon, the call transmitter comprising:

means for intermittently advancing the code bearing medium;

means for translating the information stored in the code bearing medium comprising switching means actuated responsive to the code bearing medium, each advancement of the medium presenting new information to the switching means, a rotatable encoded drum, and switching means actuated responsive to the coding on the encoded drum, the rotation of the encoded drum presenting a particular sequence of coding to the encoded drum actuated switching means; and means under the control of the translating means for generating signals out on a telephone line, the signal generating means comprising a pulsing relay energized by power from the telephone line, the pulsing relay rotating the encoded drum and interrupting the telephone line to transmit pulses thereover, and a blanking relay for shunting the interruption of the telephone line, the blanking relay being connected in parallel with the pulsing relay.

11. A call transmitter employing a code bearing medium having a plurality of digits identifying a subscriber to a telephone system encoded thereon, the call transmitter comprising:

means for intermittenly advancing the code bearing medium;

means for translating the information stored in the code bearing medium comprising switching means actuated responsive to the code bearing medium, each advancement of the medium presenting new information to the switching means, an encoded drum rotated through one complete revolution for each advancement of the medium and switching means actuated responsive to the coding on the encoded drum; and means under the control of the translating means for generating signals representing the encoded digits, the signal generating means including a pulsing relay having normally closed contacts actuated thereby in series therewith adapted to connect the pulsing relay across a telephone line whereby the pulsing relay is energized, the pulsing relay when energized opening the normally closed contact whereby the connection of the pulsing relay across the telephone line is interrupted and the pulsing relay is de-energized, the pulsing relay when de-energized closing the normally closed contacts, whereby the connection of the pulsing relay across the telephone line is re-made and the pulsing relay is energized again.

12. A call transmitter as in claim 11 wherein the code bearing medium actuated switching means includes a plurality of normally open contacts that are closed responsive to the coding on the card, and the encoded drum actuated switching means includes a plurality of normally open contacts that are closed responsive to the coding on the drum, individual normally open code bearing medium actuated contacts being connected in series with individual normally open enclosed drum actuated contacts to form branches, part of the branches being connected in parallel with one another to form a first parallel group and the rest of the branches being connected in parallel with one another to form a second parallel group, and the first and the second parallel groups being connected in series with one another to form a switching matrix, the closing of the pair of contacts in a branch of the first parallel group and the pair of contacts in a branch of the second parallel group providing a path through the switching matrix.

13. A call transmitter as in claim 12 wherein the signal generating means includes a blanking circuit shunting the pulsing relay, the blanking circuit including the switching matrix, the circuit being closed when a path is provided through the switching matrix, the circuit when closed providing a connection across the telephone line, the circuit when open permitting the pulsing relay to interrupt the telephone line and transmit pulses thereover.

14. A call transmitter as in claim 13 wherein the pulsing relay further includes normally open contacts in series with the blanking circuit, the pulsing relay when energized closing the normally open contacts and the pulsing relay when de-energized opening the normally open contacts, whereby the pulsing relay and the blanking circuit are alternatively connected across the telephone line.

15. A call transmitter as in claim 14 wherein the blanking circuit includes a blanking relay in series with the switching matrix, the blanking relay including normally open contacts in a path bypassing the switching matrix, the providing of a path through the switching matrix energizing the blanking relay to close the normally open contacts thereof and thereby shunt the switching matrix.

16. A call transmitter as in claim 15 wherein the blanking circuit further includes a path for shunting both the switching matrix and the switching matrix bypass path, the shunting path being opened and closed responsive to the encoded drum actuated switching means, the path being closed to provide an interdigital period between the transmission of the pulses out on the telephone line.

17. A call transmitter as in claim 14 wherein the pulsing relay comprises a coil, an armature movable from a first to a second position upon energization of the coil, and biasing means for moving the armature from its second to its first position on de-energization of the coil, the armature toward the end of its travel from its first to its second position operating the normally closed contacts to an open condition and the normally closed contacts to a closed condition, and the armature toward the end of its travel from its second to its first position operating the normally closed contacts to a closed condition and the normally open contacts to an open condition.

18. A call transmitter as in claim 17 further including a timing circuit in parallel with the pulsing relay coil, the timing circuit including a low speed section in parallel with a high speed section, the low speed section normally controlling the speed of operation of the pulsing relay but the low speed section being disconnected responsive to the energization of the blanking relay whereby the high speed network controls the speed of operation of the pulsing relay.

19. A call transmitter as in claim 11 further including switching means actuated responsive to the code bearing medium for stopping the operation of the pulsing relay.

20. A call transmitter employing a card having a plurality of digits identifying a subscriber to a telephone system encoded thereon and having twin columns of sprocket holes, the call transmitter comprising:

means for scanning the encoded card comprising twin sprockets adapted to mesh with the twin columns of sprocket holes in the card, the sprocket wheels being rotated by the insertion of the card into the call transmitter, a motor spring wound up by the rotation of the sprocket wheels, and an escapement mechanism for intermittently permitting the motor spring to counterrotate the sprocket wheels so as to advance the card out of the call transmitter;

means for translating the information encoded on the card comprising switching means actuated responsive to the coding on the card, each advancement of the card presenting new information to the switching means, an encoded drum rotated through one complete revolution for each advancement of the card, and switching means actuated responsive to the coding on the encoded drum, each revolution of the drum presenting a particular sequence of coding to the drum actuated switching means; and means under the control of the translating means for generating signals comprising a pulsing relay energized by power from a telephone line, the pulsing relay rotating the encoded drum and interrupting the telephone line to transmit pulses thereover, and a blanking relay for shunting the interruption of the telephone line, the blanking relay being connected in parallel with the pulsing relay.

References Cited by the Examiner

UNITED STATES PATENTS

| | | | |
|---|---|---|---|
| 2,095,298 | 10/37 | Tauschek | 179—90 |
| 2,966,557 | 12/60 | Schmitt | 179—90 |
| 2,988,603 | 6/61 | Kumagai | 179—90 |
| 3,025,358 | 3/62 | Hymel | 179—90 |
| 3,040,133 | 6/62 | Kobler et al. | 179—90 |

ROBERT H. ROSE, *Primary Examiner.*